United States Patent
Izumi et al.

(10) Patent No.: US 8,456,362 B2
(45) Date of Patent: Jun. 4, 2013

(54) RECEIVING APPARATUS, RADIO COMMUNICATION SYSTEM, POSITION ESTIMATION METHOD AND PROGRAM

(75) Inventors: Seiichi Izumi, Kanagawa (JP); Hiroaki Takano, Saitama (JP); Masanori Sato, Tokyo (JP); Hiroyuki Fukada, Tokyo (JP)

(73) Assignee: Sony Corporation, Tokyo (JP)

( * ) Notice: Subject to any disclaimer, the term of this patent is extended or adjusted under 35 U.S.C. 154(b) by 849 days.

(21) Appl. No.: 12/498,807

(22) Filed: Jul. 7, 2009

(65) Prior Publication Data

US 2010/0009644 A1    Jan. 14, 2010

(30) Foreign Application Priority Data

Jul. 14, 2008    (JP) ................. P2008-182961

(51) Int. Cl.
  *G01S 5/04*   (2006.01)
  *G01S 3/48*   (2006.01)
  *G01S 3/46*   (2006.01)

(52) U.S. Cl.
  CPC ..... *G01S 3/48* (2013.01); *G01S 3/46* (2013.01)
  USPC ........................... 342/442; 342/465; 455/132

(58) Field of Classification Search
  CPC ..................................... G01S 3/48; G01S 3/46
  USPC .................... 342/357.26, 380–384, 465, 118, 342/458, 442; 455/132
  See application file for complete search history.

(56) References Cited

U.S. PATENT DOCUMENTS

| 4,914,735 | A | * | 4/1990 | Ichiyoshi | 342/125 |
| 2006/0104198 | A1 | | 5/2006 | Takano | |
| 2008/0316104 | A1 | * | 12/2008 | Seong et al. | 342/442 |
| 2008/0316105 | A1 | * | 12/2008 | Seong et al. | 342/442 |

FOREIGN PATENT DOCUMENTS

| JP | 9-257902 | 10/1997 |
| JP | 2001-201550 | 7/2001 |
| JP | 2006-23261 | 1/2006 |
| JP | 2006-42201 | 2/2006 |
| JP | 2006-148457 | 6/2006 |
| JP | 2007-212424 | 8/2007 |
| JP | 2009-287942 | 12/2009 |
| WO | WO 2008/029812 A1 | 3/2008 |

* cited by examiner

*Primary Examiner* — Gregory C Issing
*Assistant Examiner* — Nga X Nguyen
(74) *Attorney, Agent, or Firm* — Sherr & Jiang, PLLC

(57) ABSTRACT

There is provided a receiving apparatus including a plurality of receiving antennas, each of which receives a radio signal in which sub-carriers of different frequencies are multiplexed, a phase calculation unit that calculates a phase difference of each radio signal received by the plurality of receiving antennas from that of a reference signal for each of the sub-carriers contained in the radio signals, and a path difference calculation unit that calculates a path difference, which is a difference of distances from a transmitting antenna from which the radio signals are transmitted to any two receiving antennas of the plurality of receiving antennas, based on the phase difference calculated by the phase calculation unit.

10 Claims, 19 Drawing Sheets

RECEIVING APPARATUS, RADIO COMMUNICATION SYSTEM, POSITION ESTIMATION METHOD AND PROGRAM

BACKGROUND OF THE INVENTION

1. Field of the Invention

The present invention relates to a receiving apparatus, a radio communication system, a position estimation method, and a program.

2. Description of the Related Art

In recent years, methods of estimating the position of a communication apparatus and a distance to a communication partner using radio signals transmitted and received through radio communication have been proposed. Methods of estimating a distance to a communication partner using radio signals include, for example, a method of estimating the distance in accordance with a time for a signal transmitted to the communication partner to return after being turned back and that of estimating the distance in accordance with electric field intensity of a signal transmitted from the communication partner. Methods of estimating the position of a communication apparatus include, for example, a method of using a signal from GPS (Global Positioning System) and that of combining the above distance measuring method and the three-point positioning method.

Japanese Patent Application Laid-Open No. 2006-148457 discloses an example of technique to decide a distance in accordance with a loop-back time of a radio signal. The technique disclosed by Japanese Patent Application Laid-Open No. 2006-148457 attempts to realize measurements of distance with high precision by focusing on synchronism between transmitting and receiving apparatuses and correcting the loop-back time based on a predetermined impulse response.

SUMMARY OF THE INVENTION

However, it is difficult to use, for example, the method of calculating or acquiring the distance or position using a signal from GPS indoors or underground where radio waves from GPS satellites do not reach. Moreover, when radio waves from GPS satellites reach by being reflected by a window of a building or the like, the distance or position can no longer be calculated or acquired with practical precision.

In the method of deciding a distance to a communication partner in accordance with a loop-back time of a radio signal, for example, it is necessary to strictly arrange and guarantee the time between reception of a radio signal by the communication partner and loop-back of the radio signal. Further, when the loop-back time of a radio signal by a wireless LAN (Local Area Network) is used, sufficient resolution is not obtained by a normal synchronization circuit due to the propagation velocity of signals and restrictions of sample clocks so that processing of high calculation cost becomes necessary to compensate for the resolution.

Further, for example, the method of deciding the distance in accordance with electric field intensity has an issue that an influence of variations in transmission power of a communication partner and noise of the communication environment grows.

The present invention has been made in view of the above issues and it is desirable to provide a novel and improved receiving apparatus, a radio communication system, a position estimation method and a program which are capable of improving precision with which the position is estimated using radio signals.

According to an embodiment of the present invention, there is provided A receiving apparatus, including: a plurality of receiving antennas, each of which receives a radio signal in which sub-carriers of different frequencies are multiplexed; a phase calculation unit that calculates a phase difference of each radio signal received by the plurality of receiving antennas from that of a reference signal for each of the sub-carriers contained in the radio signal; and a path difference calculation unit that calculates a path difference, which is a difference of distances from a transmitting antenna from which the radio signals are transmitted to any two receiving antennas of the plurality of receiving antennas, based on the phase difference calculated by the phase calculation unit.

According to the above configuration, a radio signal in which sub-carriers of different frequencies are multiplexed is received by each of a plurality of receiving antennas and a phase difference thereof from that of a reference signal is calculated by the phase calculation unit for each of the sub-carriers contained in each radio signal. Then, a path difference, which is a difference of distances from a transmitting antenna from which the radio signals are transmitted to any two receiving antennas of the plurality of receiving antennas, is calculated by the path difference calculation unit based on the phase difference calculated by the phase calculation unit.

The phase calculation unit may calculate an average phase difference and a phase gradient for each of the receiving antennas using the phase difference for each of the sub-carriers and the path difference calculation unit may calculate the path difference based on the average phase difference and the phase gradient calculated by the phase calculation unit.

The path difference calculation unit may calculate the path differences for two or more pairs of receiving antennas of the plurality of receiving antennas, and the receiving apparatus may further include a position estimation unit that estimates a position of the transmitting antenna using the path differences calculated for two or more pairs of receiving antennas by the path difference calculation unit.

The reference signal may be a radio signal received by one receiving antenna of the plurality of receiving antennas.

The phase calculation unit may calculate a complex conjugate value of the reference signal to calculate the phase difference by multiplying the calculated complex conjugate value of the reference signal by a signal value for each sub-carrier contained in each radio signal.

The path difference calculation unit may calculate the path difference by a subspace approach based on the phase difference calculated by the phase calculation unit.

The phase calculation unit may calculate the phase difference of each radio signal received by the plurality of receiving antennas from that of the reference signal for each of the sub-carriers contained in the radio signal a plurality of times, and the path difference calculation unit may reduce an error contained in the path difference by calculating the path difference using a plurality of the phase differences calculated the plurality of times by the phase calculation unit.

The receiving apparatus may further include a control unit that controls a frequency band of radio signals received by the plurality of receiving antennas, the plurality of receiving antennas may receive radio signals in a first frequency band and those in a second frequency band, in each of which sub-carriers of different frequencies are multiplexed, in accordance with control by the control unit, and the path difference calculation unit may reduce an error of the phase gradient used for calculation of the path difference by using a first phase gradient for each of the receiving antennas calculated for radio signals in the first frequency band and a second phase gradient for each of the receiving antennas calculated for radio signals in the second frequency band.

The radio signal may be a radio signal modulated by an Orthogonal Frequency Division Multiplexing method.

According to another embodiment of the present invention, there is provided a receiving apparatus, including: a receiving antenna that receives a plurality of radio signals, each of which is transmitted from each of a plurality of transmitting antennas and in which sub-carriers of different frequencies are multiplexed; a phase calculation unit that calculates a phase difference of each radio signal received by the receiving antenna from that of a reference signal for each of the sub-carriers contained in the radio signal; and a path difference calculation unit that calculates a path difference, which is a difference of distances from any two transmitting antennas of the plurality of transmitting antennas from which the radio signals are transmitted to the receiving antenna, based on the phase difference calculated by the phase calculation unit.

The phase calculation unit may calculate an average phase difference and a phase gradient for each of the transmitting antennas using the phase difference from the reference signal for each of the sub-carriers, and the path difference calculation unit may calculate the path difference based on the average phase difference and the phase gradient.

The path difference calculation unit may calculate the path differences for two or more pairs of transmitting antennas of the plurality of transmitting antennas, and the receiving apparatus may further include a position estimation unit that estimates a position of a local apparatus using the path differences calculated for two or more pairs of transmitting antennas by the path difference calculation unit.

The position estimation unit may estimate an absolute position of the local apparatus by further using information about absolute positions of the plurality of transmitting antennas acquired from a data part of the radio signals.

According to another embodiment of the present invention, there is provided a radio communication system, including: a transmitting apparatus, including: a plurality of transmitting antennas, each of which transmits a radio signal in which sub-carriers of different frequencies are multiplexed; and a receiving apparatus, including: a receiving antenna that receives a plurality of radio signals transmitted from the plurality of transmitting antennas; a phase calculation unit that calculates a phase difference of each radio signal received by the receiving antenna from that of a reference signal for each of the sub-carriers contained in the radio signals; and a path difference calculation unit that calculates a path difference, which is a difference of distances from any two transmitting antennas of the plurality of transmitting antennas from which the radio signals are transmitted to the receiving antenna, based on the phase difference calculated by the phase calculation unit.

The path difference calculation unit of the receiving apparatus may calculate the path differences for two or more pairs of transmitting antennas of the plurality of transmitting antennas, and the receiving apparatus may further include a position estimation unit that estimates a relative position of a local apparatus using the path difference calculated for two or more pairs of transmitting antennas by the path difference calculation unit.

The transmitting apparatus may transmit information about absolute positions of the plurality of transmitting antennas to the receiving apparatus using the radio signals, and the position estimation unit of the receiving apparatus may estimate the absolute position of the local apparatus using information about the absolute positions of the plurality of transmitting antennas acquired from the radio signals.

According to another embodiment of the present invention, there is provided a position estimation method, including the steps of: receiving a radio signal in which sub-carriers of different frequencies are multiplexed by each of a plurality of receiving antennas; calculating a phase difference of each radio signal received by the plurality of receiving antennas from that of a reference signal for each of the sub-carriers contained in the radio signal; and calculating a path difference, which is a difference of distances from a transmitting antenna from which the radio signals are transmitted to any two receiving antennas of the plurality of receiving antennas, based on the calculated phase difference.

According to another embodiment of the present invention, there is provided a program to cause a computer that controls a receiving apparatus having a plurality of receiving antennas, each of which receives a radio signal in which sub-carriers of different frequencies are multiplexed, to function, including: a phase calculation unit that calculates a phase difference of each radio signal received by the plurality of receiving antennas from that of a reference signal for each of the sub-carriers contained in the radio signal; and a path difference calculation unit that calculates a path difference, which is a difference of distances from a transmitting antenna from which the radio signals are transmitted to any two receiving antennas of the plurality of receiving antennas, based on the phase difference calculated by the phase calculation unit.

According to a receiving apparatus, a radio communication system, a position estimation method, and a program in the present invention, as described above, the precision with which the position is estimated using radio signals can be improved.

DETAILED DESCRIPTION OF THE PREFERRED EMBODIMENTS

Figure 1:
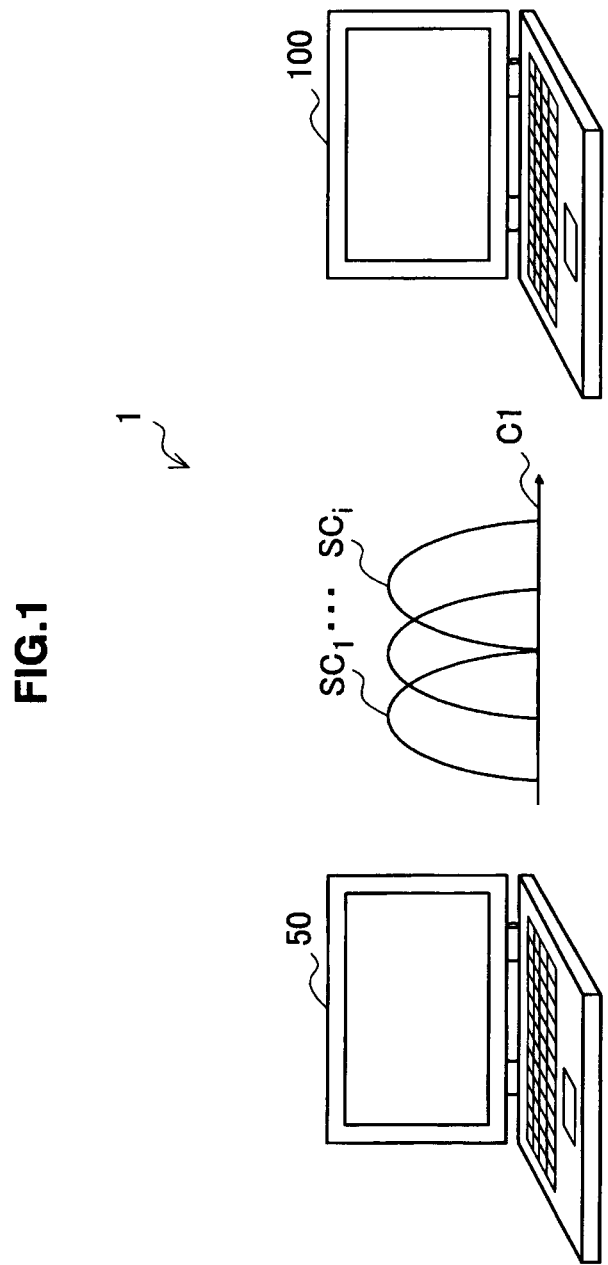
FIG. 1 is a schematic diagram showing a radio communication system according to first and second embodiments.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The present invention will be described in the order shown below:

[1] Overview of a radio communication system

[2] First embodiment (an example of the position estimation using an average phase difference and phase gradient)

[3] Second embodiment (an example using a plurality of frequency channels)

[4] Third embodiment (an example of a position notification from the transmitting side to the receiving side)

[1] Overview of a Radio Communication System

First, an overview of a radio communication system 1 according to an embodiment of the present invention will be provided with reference to FIG. 1.

FIG. 1 is a schematic diagram schematically showing the radio communication system 1 according to an embodiment of the present invention. Referring to FIG. 1, the radio communication system 1 includes a transmitting apparatus 50 and a receiving apparatus 100.

While FIG. 1 shows PCs (Personal Computers) as the transmitting apparatus 50 and the receiving apparatus 100, but the transmitting apparatus 50 and the receiving apparatus 100 are not limited to information processing devices such as PCs. For example, the transmitting apparatus 50 or the receiving apparatus 100 may be a terminal device such as a mobile phone terminal, PDA (Personal Digital Assistants), and game terminal, a communication dedicated device such as a wireless access point and router, or a radio communication module connected to these devices.

The transmitting apparatus 50 and the receiving apparatus 100 are connected by radio communication according to, for example, the OFDM (Orthogonal Frequency Division Multiplexing) method. The OFDM method is a modulation method by which modulation is performed by using sub-carriers of a plurality of frequencies orthogonal to one another in parallel and is adopted for standard specifications such as IEEE 802.11a, g, n and wireless USB.

In the example in FIG. 1, a carrier C1 is shown between the transmitting apparatus 50 and the receiving apparatus 100. In the carrier C1, a plurality of sub-carriers $SC_1$, to $SC_i$ having different frequencies is multiplexed. The receiving apparatus 100 receives a radio signal transmitted by using the carrier C1 described above to estimate the position of the transmitting apparatus 50.

The radio communication method between the transmitting apparatus 50 and the receiving apparatus 100 is not limited to the OFDM method. Each embodiment described herein is generally applicable to radio communication by a multi-carrier method using a plurality of sub-carriers having different frequencies.

[2] First embodiment (an example of the position estimation using an average phase difference and phase gradient)

Next, the first embodiment of the present invention will be described with reference to FIG. 2 to FIG. 13.

Figure 2:
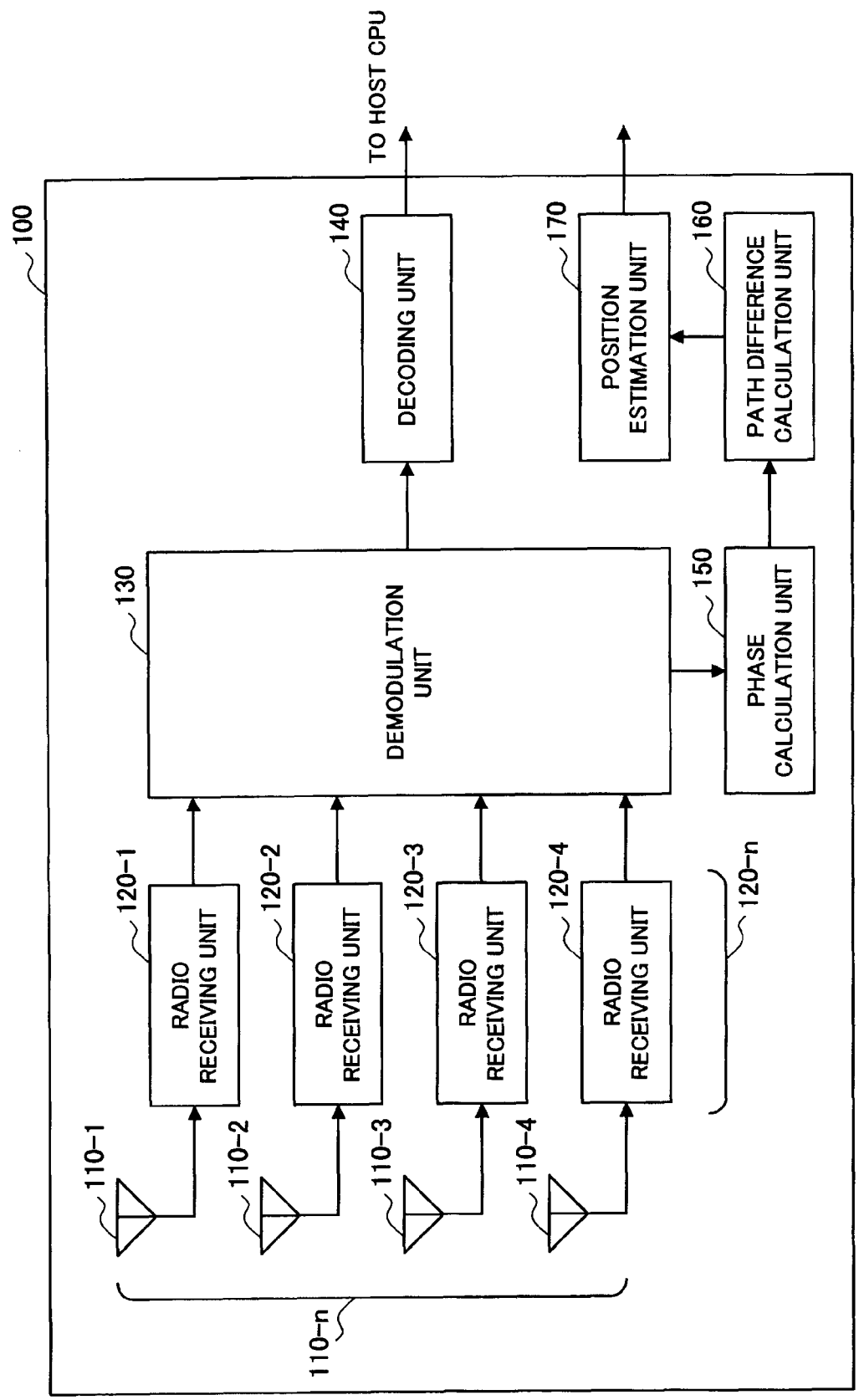
FIG. 2 is a block diagram showing a logical configuration of a receiving apparatus according to the first embodiment.

FIG. 2 is a block diagram showing a logical configuration of the receiving apparatus 100 according to the first embodiment. Referring to FIG. 2, the receiving apparatus 100 includes four receiving antennas 110-n (n=1 to 4), four radio receiving units 120-n (n=1 to 4), a demodulation unit 130, a decoding unit 140, a phase calculation unit 150, a path difference calculation unit 160, and a position estimation unit 170.

The receiving antennas 110-n are each connected to the corresponding radio receiving units 120-n to form four receiving branches. The radio receiving units 120-n are connected to the demodulation unit 130 in parallel. The demodulation unit 130 is connected to the decoding unit 140 and the phase calculation unit 150. The phase calculation unit 150 is connected to the path difference calculation unit 160. The path difference calculation unit 160 is connected to the position estimation unit 170. Then, the decoding unit 140 and the position estimation unit 170 are each connected, for example, to a host CPU (Central Processing Unit).

The receiving antennas 110-n each receive a radio signal transmitted from the transmitting apparatus 50 and output the received radio signal to the radio receiving units 120-n of the same receiving branch.

The radio receiving units 120-n perform processing such as frequency conversion and filtering on radio signals output from the receiving antennas 110-n of the same receiving branch.

Figure 3:
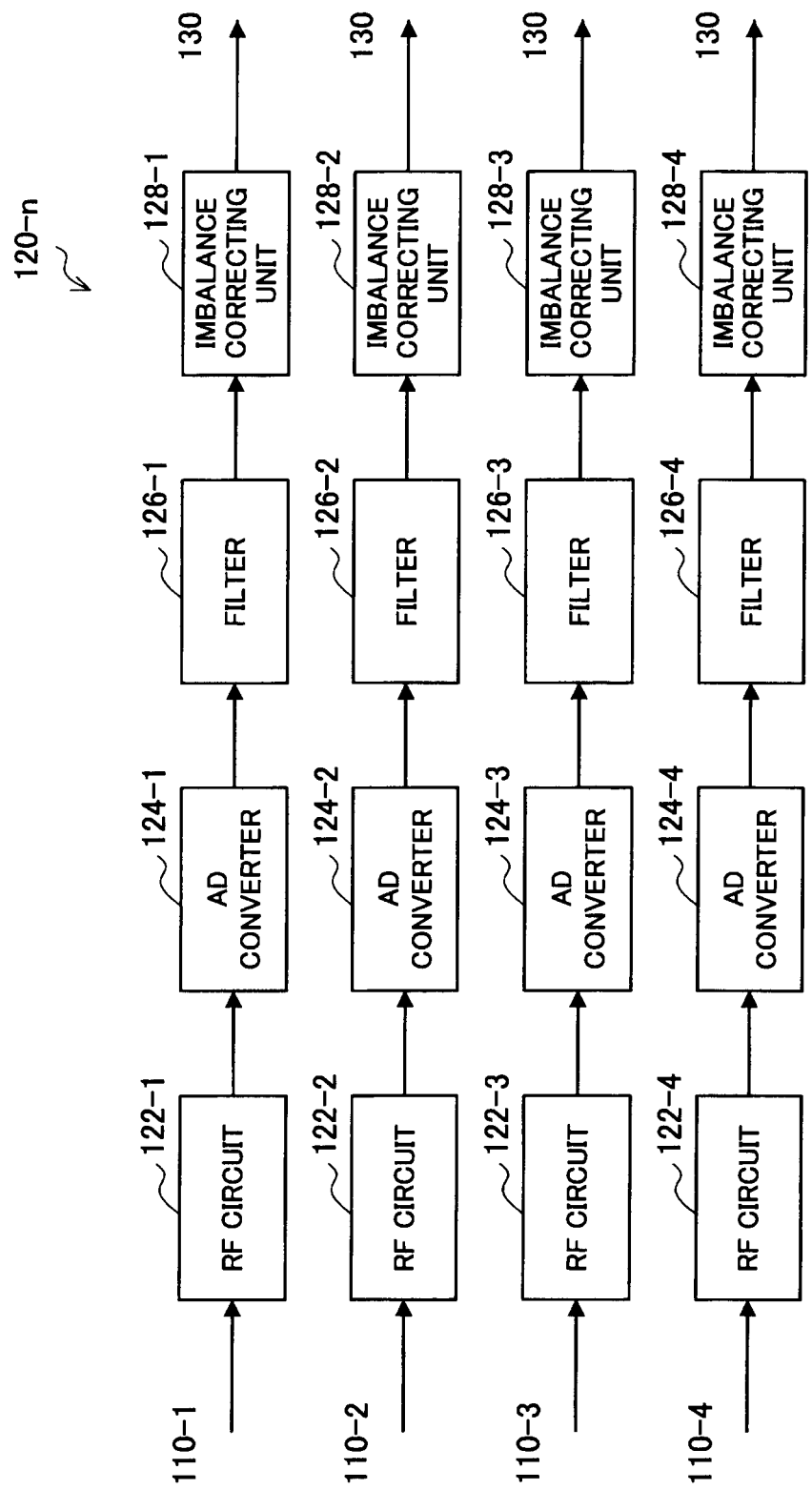
FIG. 3 is a block diagram showing an example of the configuration of a radio receiving unit according to the first embodiment.

FIG. 3 is a block diagram showing a detailed configuration of the radio receiving units 120-n. Referring to FIG. 3, the radio receiving units 120-n include RF circuits 122-n, AD (analog-digital) converters 124-n, filters 126-n, and imbalance correcting units 128-n.

A radio signal output from the receiving antenna 110-n is first amplified and frequency-converted by the RF circuit 122-n. An analog signal output from the RF circuit 122-n is converted into a digital signal by the AD converter 124-n. Filtering is performed by the filter 126-n on a received signal converted into the digital signal by the AD converter 124-n. Then, the signal output from the filter 126-n is input into the demodulation unit 130 after an influence of IQ imbalance being removed therefrom by the imbalance correcting unit 128-n.

The description of the receiving apparatus 100 will continue by returning to FIG. 2. The demodulation unit 130 demodulates a received signal input by each of the four receiving branches.

Figure 4:
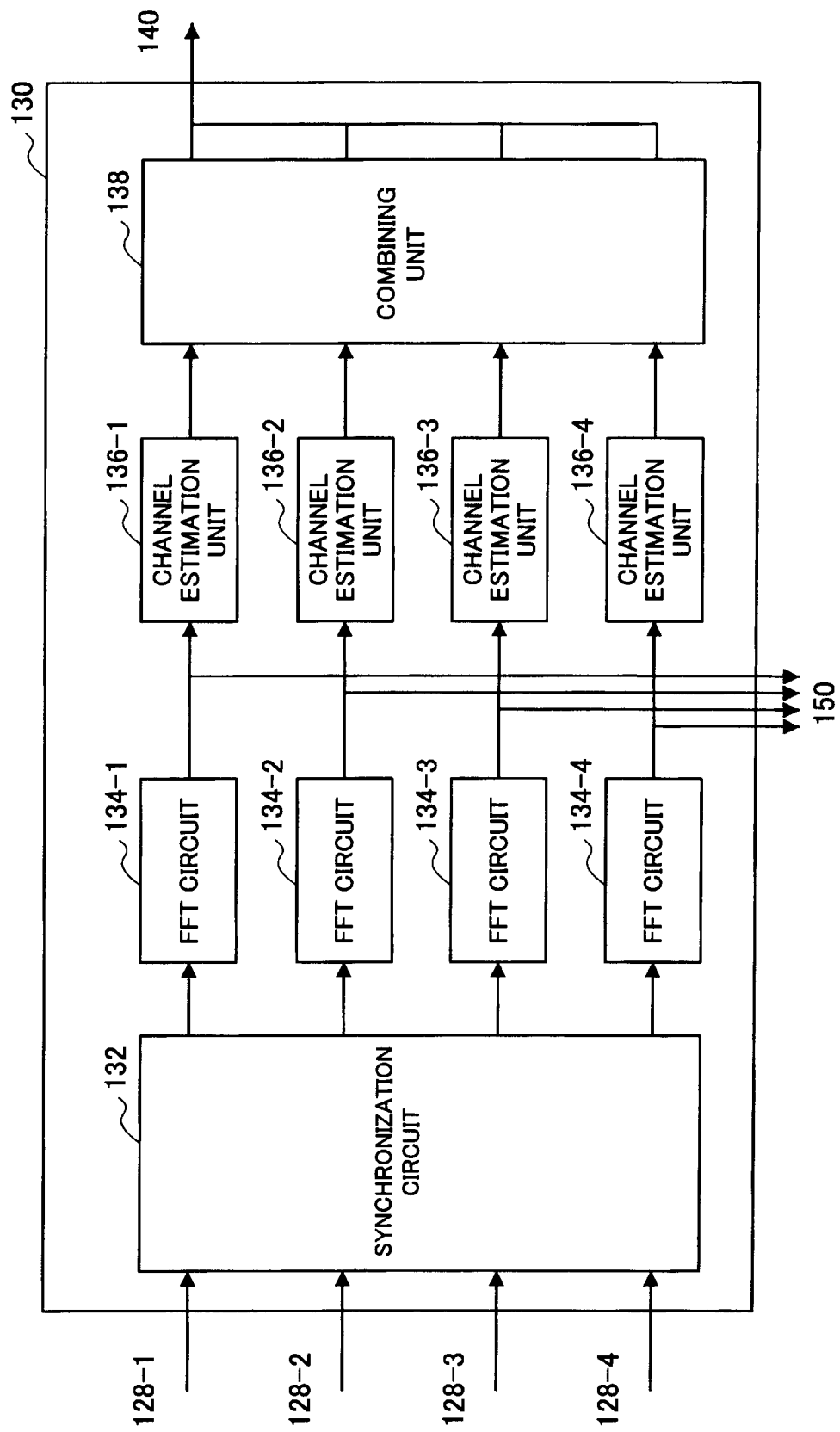
FIG. 4 is a block diagram showing an example of the configuration of a demodulation unit according to the first embodiment.

FIG. 4 is a block diagram showing the detailed configuration of the demodulation unit 130. Referring to FIG. 4, the demodulation unit 130 includes a synchronization circuit 132, FFT (Fast Fourier Transform) circuits 134-n, channel estimation units 136-n, and a combining circuit 138.

The synchronization circuit 132 detects packets from received signals input from four receiving branches, measures synchronous timing and frequency offsets, and cuts out OFDM symbols from each received signal before outputting the signal to the corresponding FFT circuit 134-n. The FFT circuits 134-n perform a fast Fourier transform of OFDM symbols output from the synchronization circuit 132 and separate the OFDM symbols for each sub-carrier. Received signals separated for each sub-carrier by the FFT circuits 134-n are combined by the combining circuit 138 according to a signal combination ratio decided based on a channel estimation result by the channel estimation units 136-n. Then, the signal combined by the combining circuit 138 is output to the decoding unit 140 as a demodulated stream signal.

The received signals separated for each sub-carrier by the FFT units 134-n are also input into the phase calculation unit 150 in parallel with being input into the channel estimation units 136-n. Processing by the phase calculation unit 150 will be described in detail later.

The description of the receiving apparatus 100 will continue by returning to FIG. 2. The decoding unit 140 decodes, as described above, the demodulated stream signal input from the demodulation unit 130.

Figure 5:
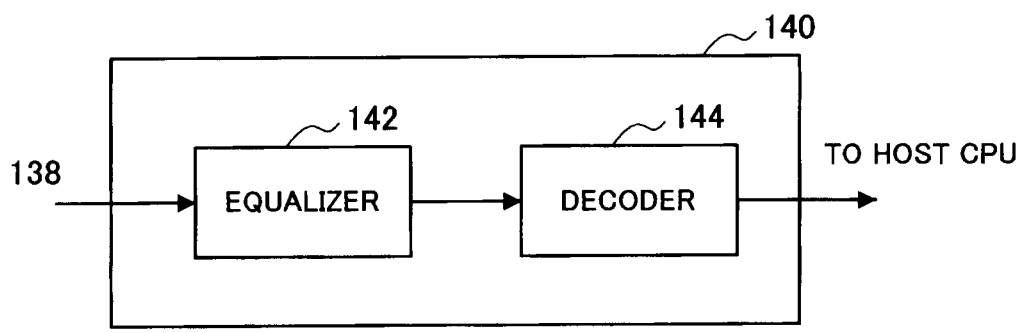
FIG. 5 is a block diagram showing an example of the configuration of a decoding unit according to the first embodiment.

FIG. 5 is a block diagram showing the detailed configuration of the decoding unit 140. Referring to FIG. 5, the decoding unit 140 includes an equalizer 142 and a decoder 144.

The demodulated stream signal input into the decoding unit 140 is digitally demodulated by the equalizer 142 and then decoded by the decoder 144. The decoded data signal is output to a host CPU.

Figure 6:
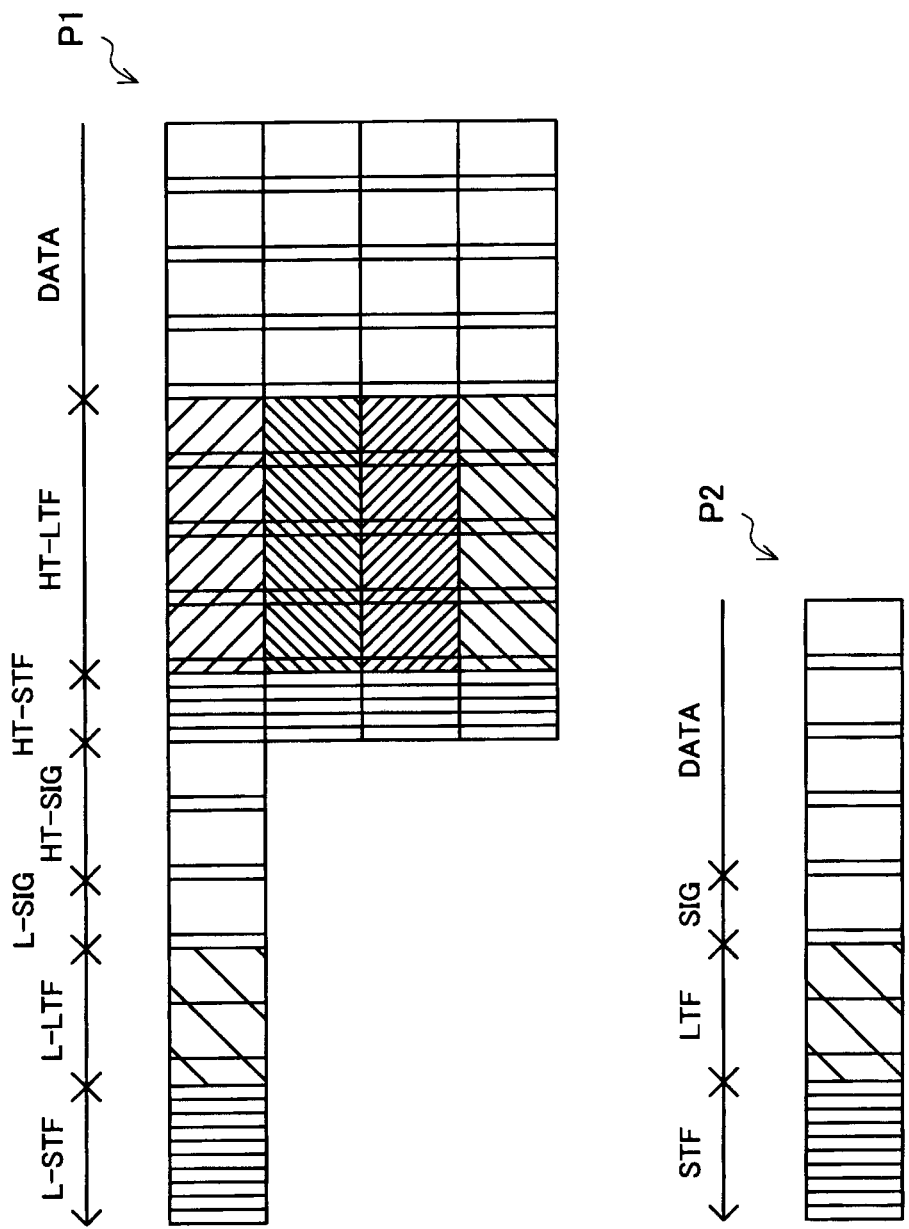
FIG. 6 is an explanatory view showing an example of the configuration of a communication packet.

FIG. 6 shows an example of the configuration of packets contained in a radio signal that may be transmitted from the transmitting apparatus 50 to the receiving apparatus 100 in the present embodiment.

The upper of FIG. 6 is an example of the configuration of a packet P1 provided in communication specifications of 802.11n that adopts the OFDM method.

The packet P1 contains each field of L-STF (Legacy-Short Training Field), L-LTF (Legacy-Long Training Field), L-SIG (Legacy-SIGnal field), HT-SIG (High Throughput-SIG), HT-STF, HT-LTF, and Data (data part).

Among these fields, L-STF is used, for example, for detection of packets by the synchronization circuit 132 described above. L-LTF is used, for example, for measuring a frequency offset by the synchronization circuit 132 and channel estimation by the channel estimation units 136-n. L-SIG and HT-SIG contain control information such as the data length, communication rate, and modulation method. HT-STF is used, for example, for gain adjustments and HT-LTF for acquisition of a MIMO (Multiple Input Multiple Output) channel matrix. The data part contains data symbols.

On the other hand, the lower of FIG. 6 is an example of the configuration of a packet P2 provided in communication specifications of IEEE802.11 a that adopts the OFDM method. The packet P2 contains each field of STF, LTF, SIG, and Data.

Here, if, for example, radio signals transmitted from a transmitting antenna are received by a plurality of receiving antennas 110-n, a difference in path length transmitted on a communication path arises in accordance with the position of the receiving antennas 110-n.

Figure 7:
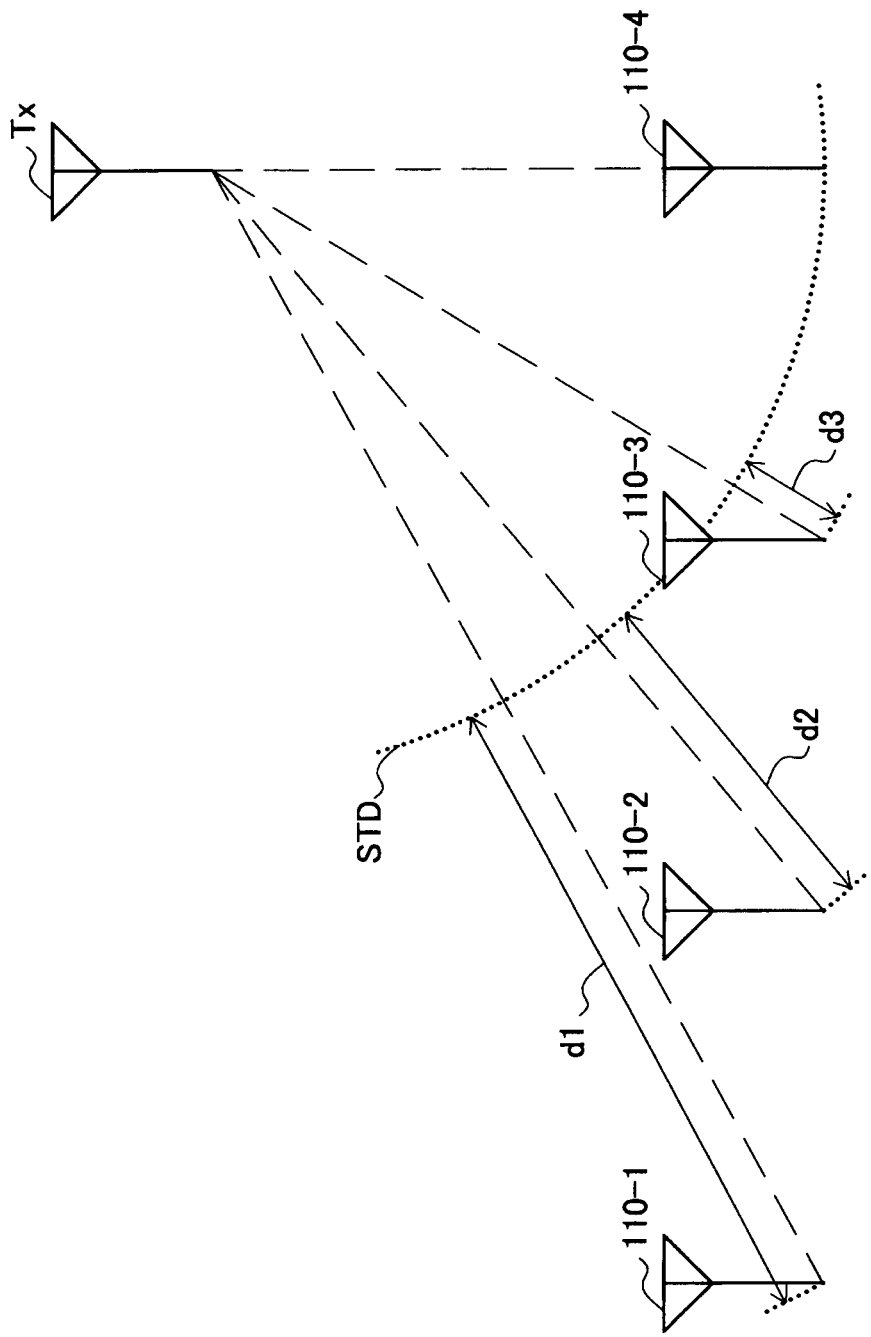
FIG. 7 is an explanatory view illustrating a path difference from a transmitting antenna to each receiving antenna.

FIG. 7 is an explanatory view conceptually showing such a difference in path length of radio signal in accordance with the position of the receiving antennas 110-n. Referring to FIG. 7, paths of radio signals from a transmitting antenna Tx to the receiving antennas 110-1, 110-2, 110-3, and 110-4 are shown.

In FIG. 7, an arc STD shows a trajectory of positions having a distance to the transmitting antenna Tx equal to a path length of radio signal from the transmitting antenna Tx to the receiving antenna 110-4.

If the path length to the receiving antenna 110-4 is used as a reference length, the path length from the transmitting antenna Tx to the receiving antenna 110-1 is longer by a distance d1. It is also evident that the path length from the transmitting antenna Tx to the receiving antenna 110-2 is longer by a distance d2 and that from the transmitting antenna Tx to the receiving antenna 110-3 by a distance d3. Such differences in path length among receiving antennas, that is, for example, the distances d1, d2, and d3 are herein called path differences.

Thus, if a path difference d exists between the receiving antennas 110-n, a phase shift occurs in radio signals received by the receiving antennas 110-n. A phase shift in radio signals received by the receiving antennas 110-n, that is, a relationship between a phase difference $\phi$ and a path difference d between the receiving antennas 110-n is expressed by the following formula:

[Math 1]

$$d = \lambda \times \left( m + \frac{\phi}{2\pi} \right) \qquad (1)$$

where $\lambda$ is the wavelength of a radio signal and m is an integer indicating how many times the phase moves around during the path difference d.

According to Formula (1), if the path difference d is constant, the phase difference $\phi$ depends on wavelength $\lambda$ of a radio signal. Thus, when a radio signal in which sub-carriers of different frequencies are multiplexed, for example, a radio signal by the OFDM method is used, even if the receiving antenna 110-n is the same, the detected phase is different from sub-carrier to sub-carrier of the radio signal received by the receiving antennas 110-n.

Figure 8:
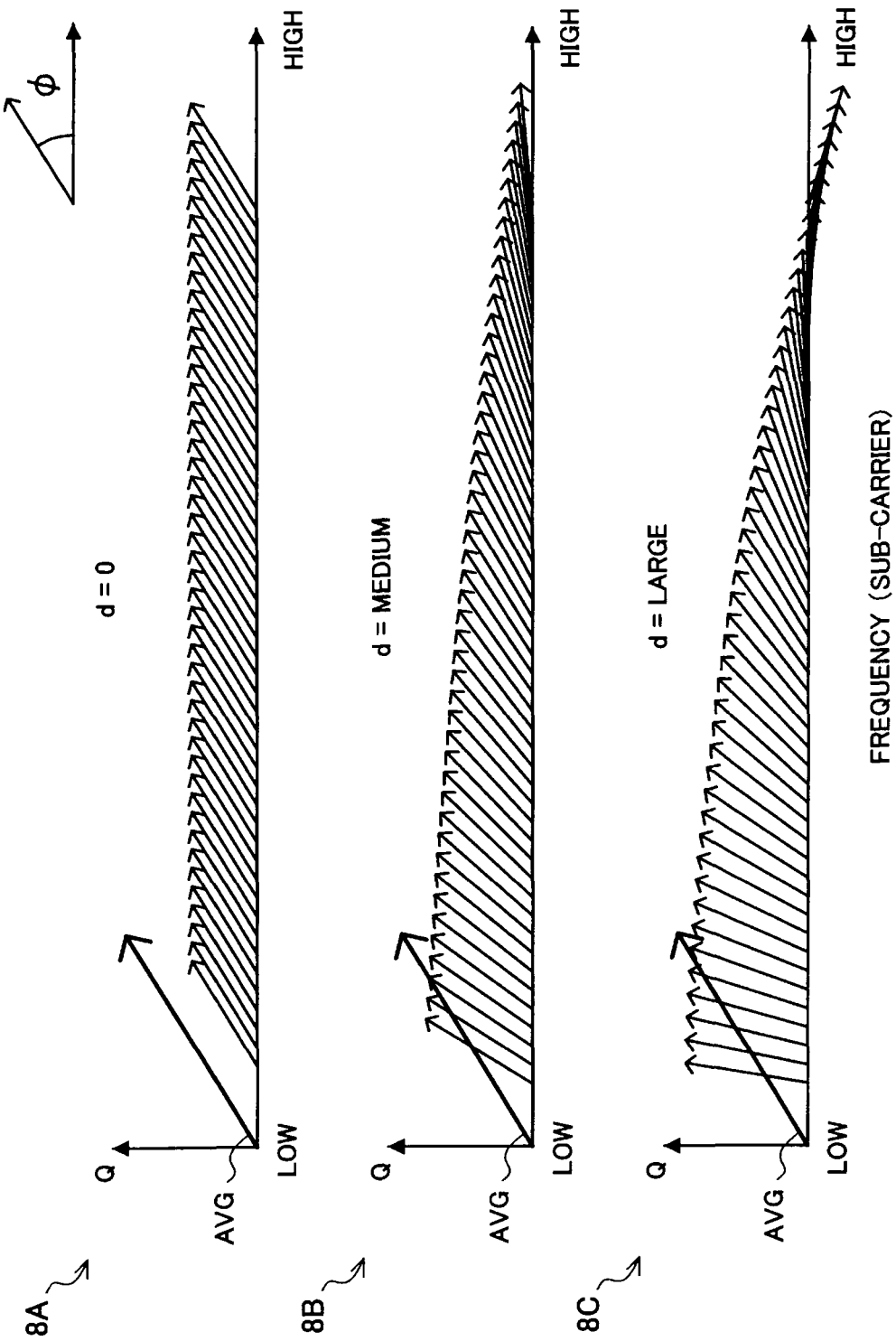
FIG. 8 is an explanatory view illustrating torsion of a phase difference and phase for each sub-carrier.

FIG. 8 is an explanatory view conceptually showing phase differences for each sub-carrier in the same receiving antenna 110-n.

Among FIG. 8A to 8C, FIG. 8A shows phase differences for each sub-carrier when the path difference d from a reference antenna is d=0. In contrast, FIG. 8B shows phase differences for each sub-carrier when the path difference d is medium and FIG. 8C shows phase differences when the path difference d is large.

Many small arrows shown in FIG. 8A to 8C indicate each sub-carrier contained in a radio signal. The horizontal axis of each figure is an axis for frequency of each sub-carrier. That is, arrows shown on the right side in the figures correspond to sub-carriers of higher frequencies (that is, shorter wavelengths) than those shown on the left side in the figures. The rotation angle with respect to the horizontal axis indicates the phase difference $\phi$ detected for the corresponding sub-carrier.

Referring to FIG. 8A, the phase difference $\phi$ is constant regardless of the frequency of the sub-carrier when the path difference d=0. In the example in FIG. 8B, on the other hand, if the average of phase differences among sub-carriers is an arrow AVG, the phase difference $\phi$ is larger than that of the arrow AVG for sub-carriers of lower frequencies and smaller than that of the arrow AVG for sub-carriers of higher frequencies. Such torsion of phase can be quantified as a variation of phase relative to a predetermined variation of frequency. Such a variation of phase is herein called a phase gradient. In the example in FIG. 8C in which the path difference d is larger, torsion of phase becomes still larger.

In 40 MHz mode of the standard specification of IEEE802.11n, as an example, a central frequency of a radio signal is set at $f_{mid}$=5 [GHz], a bottom frequency at $f_{btm}$=4.98 [GHz], and a top frequency at $f_{top}$=5.02 [GHz]. Then, the wavelength for the central frequency becomes the wavelength $\lambda_{mid}$=6.00 [cm], the wavelength for the bottom frequency the wavelength $\lambda_{btm}$=6.024 [cm], and the wavelength for the top frequency the wavelength $\lambda_{btm}$=5.976 [cm].

Here, it is assumed that the path difference d=6 [cm]. In this case, the phase difference for the central frequency becomes $\phi_{mid}$=2π, that is, the average phase difference of all sub-carriers in one frequency band becomes $\phi_{AVG}$=2π. On the other hand, the phase difference for the bottom frequency becomes $\phi_{btm}$=2π×(6.00/6.024) and the phase difference for the top frequency $\phi_{top}$=2π×(6.00/5.976). Thus, torsion of phase between both ends of the frequency band becomes $\phi_{top}$−$\phi_{btm}$=approximately 2.88 [deg].

The relationship for the average phase difference $\phi_{AVG}$ among the receiving antennas 110-n and the phase gradient θ in the receiving antenna 110-n, and the path difference d between the receiving antennas 110-n will further be described.

From an equation of discrete Fourier transform, a relationship between a signal $x_n$ and a signal $x_{n+1}$ after one step of sample transition is expressed by the following formula:

[Math 2]

$$\sum x_{n+1} \exp(i2\pi nk/N) = \sum x_n \exp(i2\pi(n-1)k/N) \quad (2)$$
$$= \sum x_n \exp(i2\pi nk/N)\exp(-i2\pi k/N) \quad (3)$$
$$= X_k \exp(-i2\pi k/N) \quad (4)$$

That is, torsion of phase corresponding to one round (360°) arises extending over all sub-carriers in one frequency band. The path difference corresponding to torsion between both ends of the frequency band of 40 [MHz] is 3×10⁸ [m]/40 [MHz]=7.5 [m]. Thus, one round of torsion of phase is reached with the path difference d=7.5 [m]. The path difference d=6 [cm] corresponds to 2.88 [deg].

Here, if the average phase difference among the receiving antennas 110-n is $\phi_{AVG}$=0 [deg], the path difference d will be a value of 0 or an integral multiple of the wavelength λ, accordingly the path difference d is not uniquely determined from the value of the average phase difference $\phi_{AVG}$ alone. Thus, in the present embodiment, the path difference d is decided by further considering the phase gradient θ based on the following relational expression.

First, a relationship between the wavelength $\lambda_{mid}$ of the central frequency (corresponding to a carrier frequency) and the wavelength $\lambda_s$ of any sub-carrier is derived like the following formula from Formula (1):

[Math 3]

$$d = \lambda_{mid} \times \left(m + \frac{\phi_{AVG}}{2\pi}\right) \quad (5)$$
$$= \lambda_s \times \left(m + \frac{\phi_{AVG} + \delta\phi}{2\pi}\right) \quad (6)$$

where δφ is a phase difference between the phase in the central frequency and that in the relevant sub-carrier. If the phase difference between adjacent sub-carriers on a frequency axis is defined as a phase gradient θ, the phase difference δφ is given by the following formula:

[Math 4]

$$\delta\phi = \theta \times N \quad (7)$$

where N is the number of sub-carriers present between the central frequency and the frequency of the relevant sub-carrier. A relationship between the wavelength $\lambda_{mid}$ and the wavelength $\lambda_s$ is expressed by the following formula using the central frequency $f_{mid}$ and the frequency $f_s$ of the sub-carrier:

[Math 5]

$$\frac{\lambda_{mid}}{\lambda_s} = \frac{f_s}{f_{mid}} \quad (8)$$

The following formula is derived from Formulas (5), (6), and (8):

[Math 6]

$$\frac{f_s}{f_{mid}}(2\pi m + \phi_{AVG}) = 2\pi m + \phi_{AVG} + \delta\phi \quad (9)$$

Further, the ratio $\theta_\lambda$ of torsion of phase in the relevant sub-carrier is defined like the following formula:

[Math 7]

$$\theta_\lambda = \frac{f_s}{f_{mid}} - 1 \quad (10)$$

Then, an integer m in Formula (1) expressing the relation of the path difference d and the phase difference φ is derived like the following formula from Formula (9) and Formula (10):

[Math 8]

$$m = \frac{\delta\phi - \theta_\lambda \cdot \phi_{AVG}}{2\pi\theta_\lambda} \quad (11)$$

In Formula (11), among parameters to decide m, $\theta_\lambda$ does not depend on the path difference d. Thus, if the path difference d changes in accordance with the position of the receiving antenna 110-n, it is understood that the integer m indicating how many times the phase moves around during the path difference d can be decided using the average phase difference $\phi_{AVG}$ for each of the receiving antennas 110-n and the phase gradient φ for deciding $\delta_\phi$.

Then, if the integer m is decided, the path difference d between the receiving antennas 110-n can be calculated by Formula (1) using further the wavelength $\lambda_{mid}$ of the central frequency and the average phase difference $\phi_{AVG}$.

In FIG. 2, the phase calculation unit 150 calculates the average phase difference $\phi_{AVG}$ and the phase gradient θ necessary to calculate the path difference d between the receiving antennas 110-n described above using a demodulated stream signal input from the demodulation unit 130.

Figure 9:
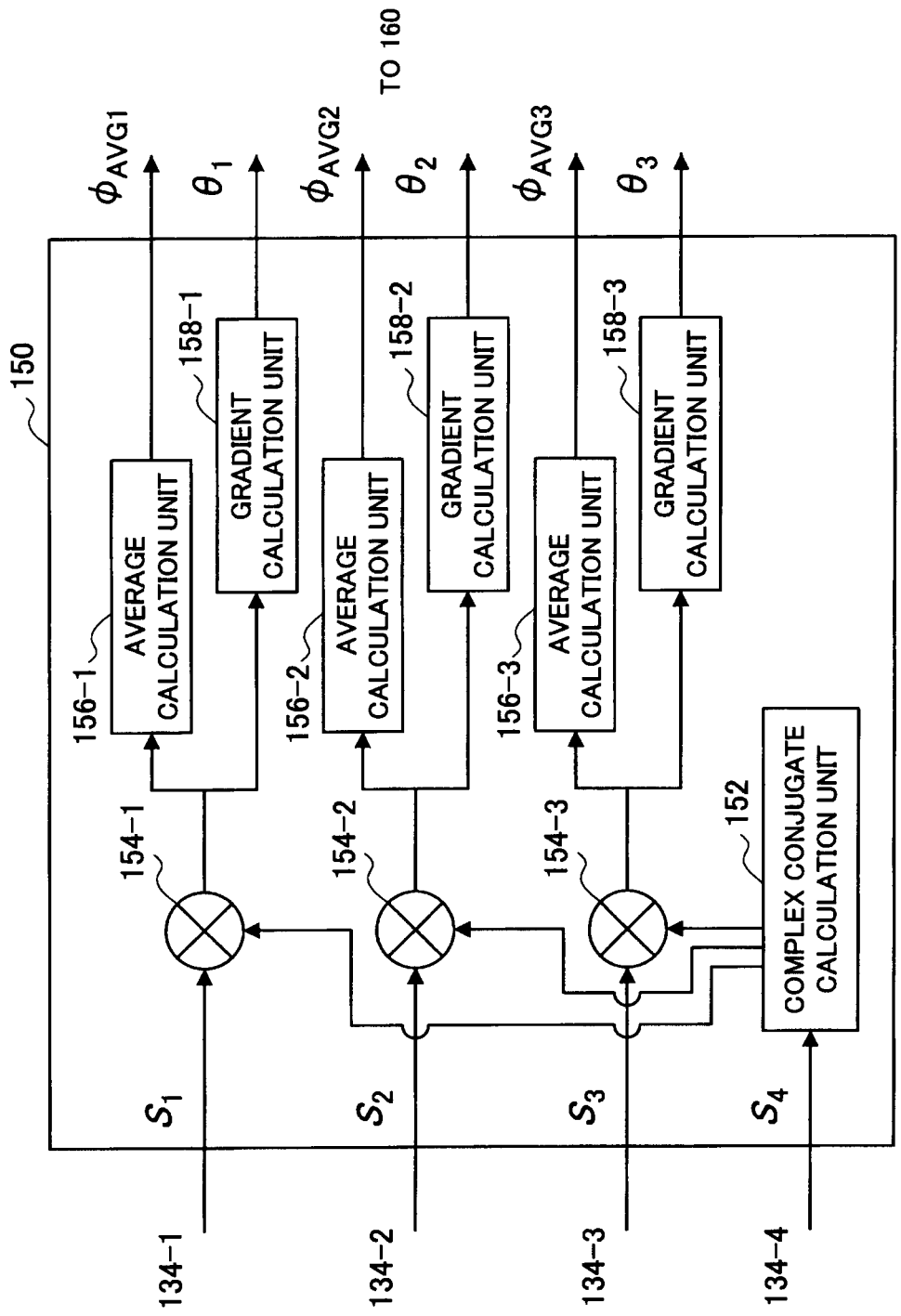
FIG. 9 is a block diagram exemplifying the configuration of a phase calculation unit according to the first embodiment.

FIG. 9 is a block diagram showing the detailed configuration of the phase calculation unit 150. Referring to FIG. 9, the phase calculation unit 150 includes a complex conjugate calculation unit 152, multipliers 154-m (m=1, 2, 3), average calculation units 156-m, and gradient calculation units 158-m.

In the example in FIG. 9, the phase calculation unit 150 uses an input signal corresponding to a radio signal received by, among the receiving antennas 110-n, the receiving antenna 110-4 as a reference signal for calculating a phase difference. Thus, a stream signal $S_4$ demodulated after being received by the receiving antenna 110-4 is input into the complex conjugate calculation unit 152. On the other hand, stream signals $S_1$, $S_2$, and $S_3$ demodulated after being received by the receiving antennas 110-1, 110-2, and 110-3 are input into the multipliers 154-1, 154-2, and 154-3 respectively.

The complex conjugate calculation unit 152 calculates a complex conjugate value of the stream signal $S_4$ and input a signal obtained as a result thereof into the multipliers 154-1, 154-2, and 154-3.

The multipliers 154-1, 154-2, and 154-3 multiply the complex conjugate value of the stream signal $S_4$ input from the complex conjugate calculation unit 152 by the stream signals $S_1$, $S_2$, and $S_3$ respectively. As a result, a respective phase difference of a signal value of each sub-carrier contained in the stream signals $S_1$, $S_2$, and $S_3$ from that of the reference signal is calculated.

Then, the average calculation unit 156-1 calculates an average phase difference $\phi_{AVG1}$ for the receiving antenna 110-1 using the phase difference for each sub-carrier of the stream signal $S_1$ calculated by the multiplier 154-1. In addition, the gradient calculation unit 158-1 calculates a phase gradient $\theta_1$ for the receiving antenna 110-1 using the phase difference.

Similarly, the average calculation unit 156-2 calculates an average phase difference $\phi_{AVG2}$ for the receiving antenna 110-2 and the gradient calculation unit 158-2 calculates a phase gradient $\theta_2$ for the receiving antenna 110-2. Further, the average calculation unit 156-3 calculates an average phase difference 100$_{AVG3}$ for the receiving antenna 110-3 and the gradient calculation unit 158-3 calculates a phase gradient $\theta_3$ for the receiving antenna 110-3.

The average phase difference $\phi_{AVG1}$ and phase gradient $\theta_1$, the average phase difference $\phi_{AVG2}$ and phase gradient $\theta_2$, and the average phase difference $\phi_{AVG3}$ and phase gradient $\theta_3$ obtained as a result of the above processing are output to the path difference calculation unit 160.

Here, an example in which a signal received by the receiving antenna 110-4 is selected as a reference signal, which is used as the reference for calculating a phase difference, is described. However, the reference signal may be a signal received by any receiving antenna or, for example, a known signal provided in advance.

In FIG. 2, the path difference calculation unit 160 calculates a difference of paths from a transmitting antenna from which radio signals are transmitted to any two receiving antennas according to the above Formula (1) to Formula (11) using the average phase difference and phase gradient for each of the receiving antennas 110-n input from the phase calculation unit 150.

Here, assume that as a result of calculation by the path difference calculation unit 160, a path difference $d_{14}$ between the receiving antenna 110-1 and the receiving antenna 110-4 is obtained. Then, the position of the transmitting antenna from which radio signals are transmitted can be considered to be on a curved surface on which a difference between the distance from the receiving antenna 110-1 and that from the receiving antenna 110-4 is constant (that is, $d_{14}$).

Figure 10:
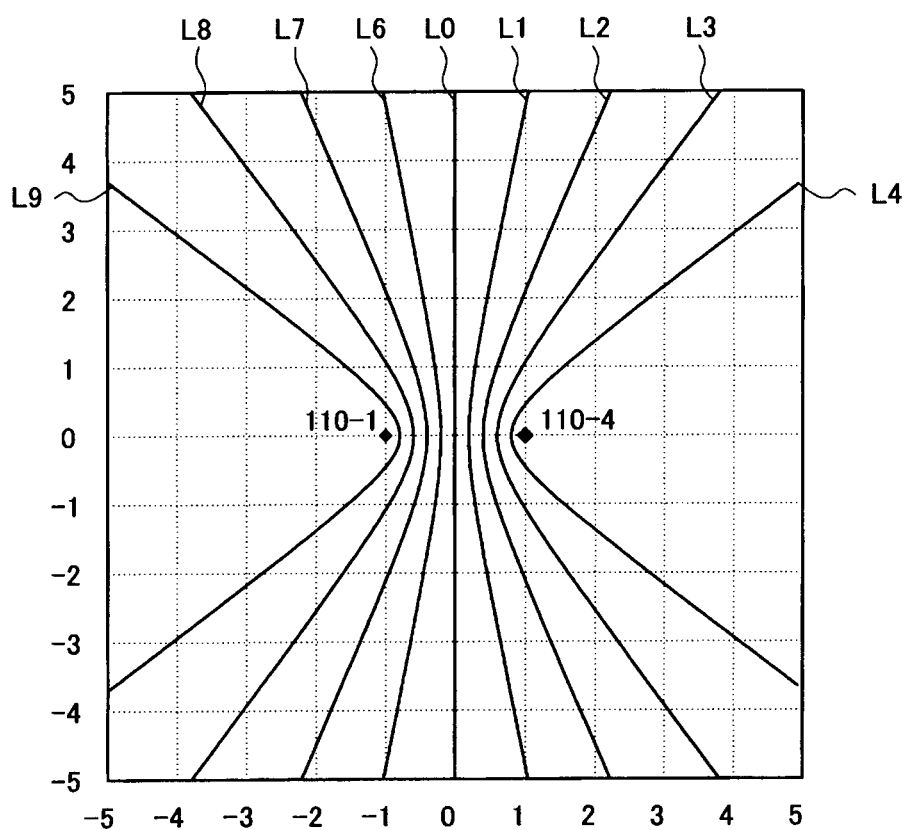
FIG. 10 is an explanatory view showing an example of the position of the transmitting antenna estimated based on the path difference.

FIG. 10 is an explanatory view showing the position of the transmitting antenna estimated from the path difference $d_{14}$ in a two-dimensional plane that passes the receiving antenna 110-1 and the receiving antenna 110-4.

In FIG. 10, the receiving antenna 110-1 and the receiving antenna 110-4 are positioned at coordinates (−1, 0) and (1, 0) on a horizontal axis passing through the origin.

If the path difference $d_{14}$ between the receiving antenna 110-1 and the receiving antenna 110-4 is $d_{14}$=0, the transmitting antenna is positioned on a straight line L0 passing through intermediate points of the receiving antenna 110-1 and the receiving antenna 110-4.

If the path difference $d_{14}$≠0, trajectories drawn by positions of the transmitting antenna theoretically form hyperbolas. Then, the receiving antenna 110-1 and the receiving antenna 110-4 are positions at focal points of such hyperbolas.

If, for example, the path difference $d_{14}$ is 20% of the interval between the receiving antenna 110-1 and the receiving antenna 110-4, the transmitting antenna is positioned on a hyperbola L1 or a hyperbola L6. It is possible to decide on which of the hyperbola L1 and the hyperbola L6 the transmitting antenna is positioned by determining whether the phase of the receiving antenna 110-1 leads or lags with respect to the receiving antenna 110-4.

Similarly, if the path difference $d_{14}$ is 40% of the interval between the receiving antenna 110-1 and the receiving antenna 110-4, the transmitting antenna is positioned on a hyperbola L2 or a hyperbola L7. If the path difference $d_{14}$ is 60% of the interval between the receiving antenna 110-1 and the receiving antenna 110-4, the transmitting antenna is positioned on a hyperbola L3 or a hyperbola L8. Further, if the path difference $d_{14}$ is 80% of the interval between the receiving antenna 110-1 and the receiving antenna 110-4, the transmitting antenna is positioned on a hyperbola L4 or a hyperbola L9.

Figure 11:
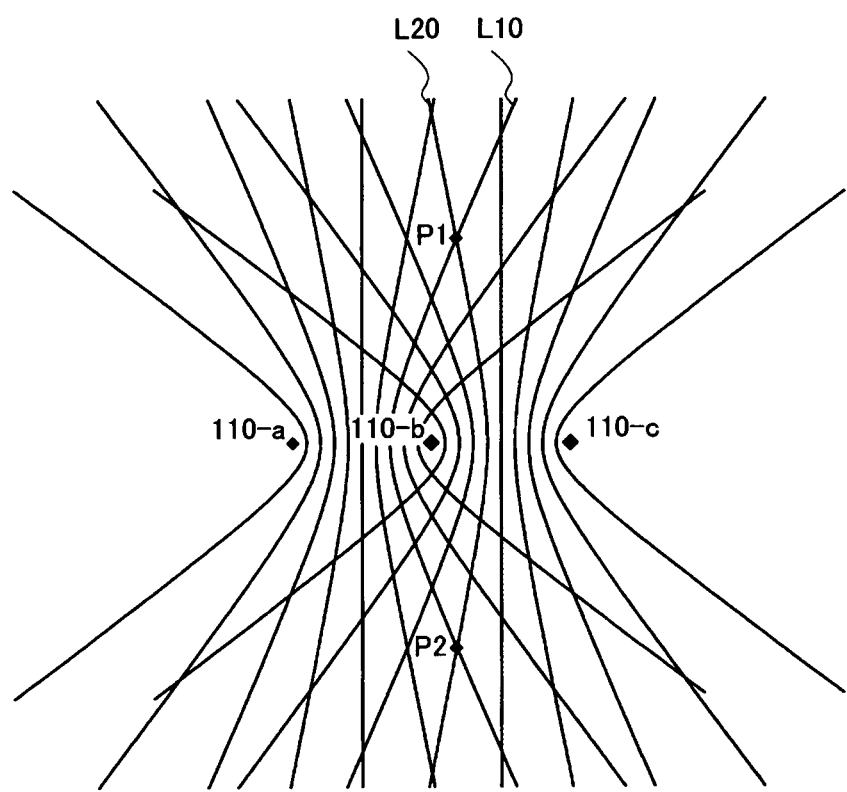
FIG. 11 is an explanatory view showing another example of the position of the transmitting antenna estimated based on the path difference.

FIG. 11 is an explanatory view illustrating an example of estimating the position of the transmitting antenna based on a path difference, among the receiving antennas 110-n, between receiving antennas 110-a and 110-b and those between receiving antennas 110-b and 110-c.

In FIG. 11, it is assumed that the transmitting antenna is estimated, for example, on a curve L10 based on the path difference between the receiving antennas 110-a and 110-b. It is also assumed that the transmitting antenna is estimated, for example, on a curve L20 based on the path difference between the receiving antennas 110-b and 110-c. Then, the transmitting antenna is estimated to be positioned at an intersection point P1 or P2 of the curve L10 and the curve L20.

Figure 12:
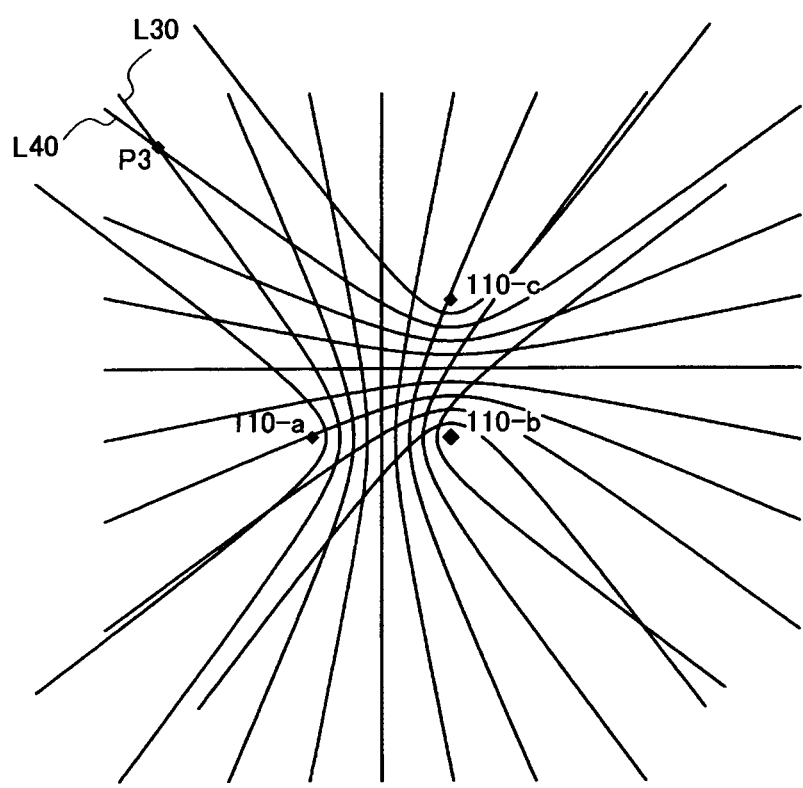
FIG. 12 is an explanatory view showing still another example of the position of the transmitting antenna estimated based on the path difference.

FIG. 12 is an explanatory view illustrating another example of estimating the position of the transmitting antenna based on a path difference between the receiving antennas 110-a and 110-b and those between receiving antennas 110-b and 110-c.

In FIG. 12, it is assumed that the transmitting antenna is estimated, for example, on a curve L30 based on the path difference between the receiving antennas 110-a and 110-b. It is also assumed that the transmitting antenna is estimated, for example, on a curve L40 based on the path difference between the receiving antennas 110-b and 110-c. Then, the transmitting antenna is estimated to be positioned at an intersection point P3 of the curve L30 and the curve L40.

As described using FIG. 11 and FIG. 12, the position of a transmitting antenna on a two-dimensional plane can be estimated using path differences calculated for each of two pairs of receiving antennas among the receiving antennas 110-n. By extending the idea, it is understood that the position of a transmitting antenna in a three-dimensional space can be estimated using path differences calculated for each of three or more pairs of receiving antennas among the receiving antennas 110-n.

In FIG. 2, the position estimation unit 170 estimates in this manner the position of the transmitting antenna from which radio signals are transmitted using path differences calculated for two or more pairs of receiving antennas 110-n by the path difference calculation unit 160.

Figure 13:
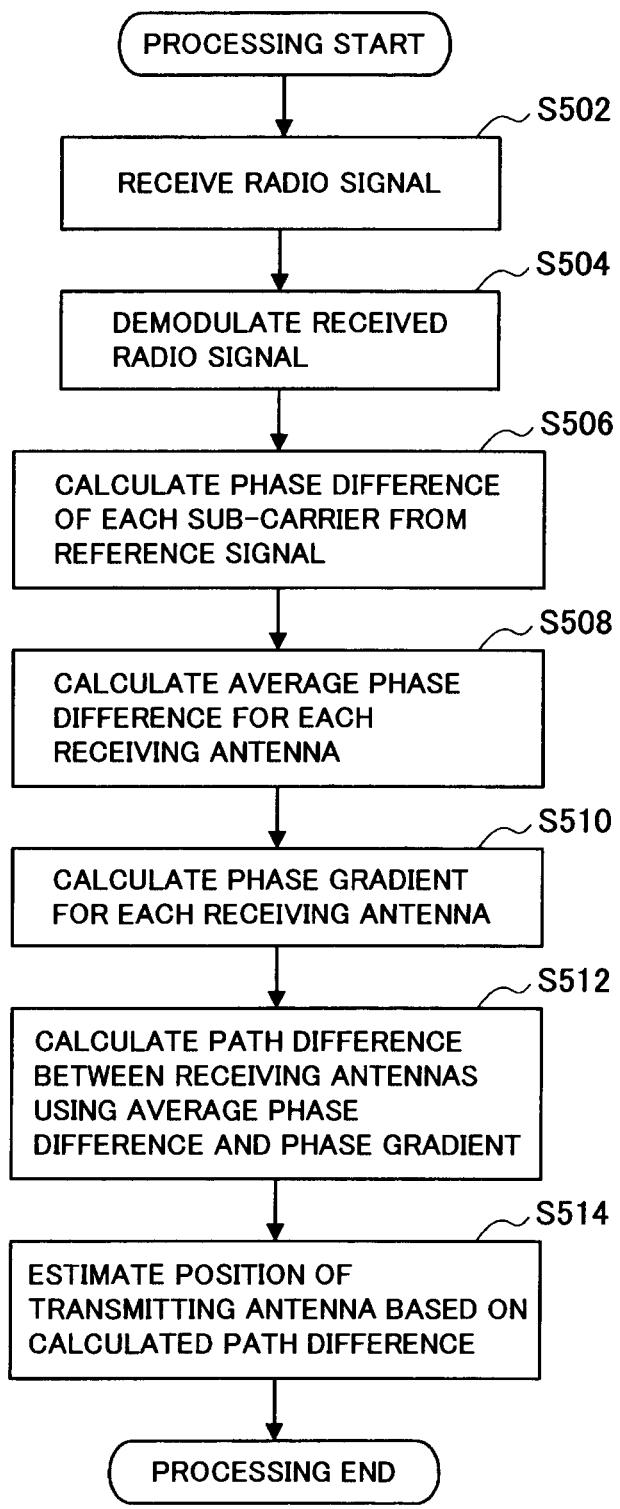
FIG. 13 is a flow chart showing an example of position estimation processing according to the first embodiment.

FIG. 13 is a flow chart showing an example of position estimation processing of a transmitting antenna by the receiving apparatus 100 according to the present embodiment.

Referring to FIG. 13, first, radio signals in which sub-carriers of different frequencies are multiplexed are received by each of the plurality of receiving antennas 110-n (S502).

Next, received signals after being converted into digital signals by the radio receiving units 120-n are demodulated by the demodulation unit 130 and before being separated into signals for each sub-carrier (S504).

Then, a phase difference of each signal separated for each sub-carrier from that of a reference signal is calculated by the phase calculation unit 150 (S506). Here, the phase calculation unit 150 selects, for example, a signal received by one receiving antenna of the receiving antennas 110-n as the reference signal and multiplies the complex conjugate value of the reference signal by the signal value of each sub-carrier to calculate a phase difference for each sub-carrier. In this case, the reference signal may be a known signal provided in advance, instead of a signal received by one receiving antenna.

Subsequently, the phase calculation unit 150 calculates an average phase difference for each of the receiving antennas 110-n using phase differences calculated for each sub-carrier (S508). The phase calculation unit 150 also calculates a phase gradient for each of the receiving antennas 110-n using phase differences calculated for each sub-carrier (S510).

Then, the path difference calculation unit 160 calculates a difference of paths from the transmitting antenna from which radio signals are transmitted to any two receiving antennas of the receiving antennas 110-n based on the average phase difference and phase gradient for each receiving antenna calculated by the phase calculation unit 150 (S512).

Further, the position of the transmitting antenna is estimated by the position estimation unit 170 using path differences calculated for two or more pairs of receiving antennas by the path difference calculation unit 160 (S514).

Up to now, the receiving apparatus 100 according to the first embodiment of the present invention has been described using FIG. 2 to FIG. 13. According to the present embodiment, radio signals in which sub-carriers of different frequencies are multiplexed are received by a plurality of receiving antennas and a difference of paths from the transmitting antenna to any two receiving antennas is calculated based on the phase difference calculated for each sub-carrier contained in each radio signal. Accordingly, the precision with which the position is estimated using radio signals can be improved without requesting additional requirements such as a guarantee of the loop-back time of a signal from a communication partner.

In this case, the phase difference for each sub-carrier may be calculated, for example, by multiplying the complex conjugate value of the reference signal by the signal value of each sub-carrier. Further, the difference of paths from the transmitting antenna to two receiving antennas may be calculated based on the average phase difference and phase gradient for each receiving antenna. In such cases, path differences between receiving antennas can be calculated at relatively low calculation costs.

Calculations of path difference may be performed for any two or more pairs of receiving antennas. For example, the position of a communication partner on a two-dimensional plane can be estimated by calculating path differences of two pairs of receiving antennas. Further, the position of a communication partner in a three-dimensional space can be estimated by calculating path differences for three or more pairs of receiving antennas.

A radio signal received by one receiving antenna among the plurality of receiving antennas may be used as a reference signal serving as the reference for a phase difference for each sub-carrier. In such a case, because a phase difference is calculated between radio signals reached by passing through the same communication environment, influences of the communication environment on signals cancel out each other so that precision of position estimation is improved.

In the present embodiment, a difference of paths from the transmitting antenna to the receiving antennas 110-n is calculated using the average phase difference and phase gradient. Instead, however, path differences to the receiving antennas 110-n may be calculated by using the subspace approach such as the MUSIC (MUltiple SIgnal Classification) method or ESPRIT (Estimation of Signal Parameters via Rotational Invariance Techniques) method.

Moreover, calculation processing of a phase difference by the phase calculation unit 150 may be repeated a plurality of times for one radio signal to calculate a path difference between receiving antennas based on a plurality of phase differences obtained as the result. An error contained in a calculation result of path difference can be reduced, for example, by calculating the path difference based on the average value or medium value of phase differences calculated the plurality of times for the same sub-carrier.

[3] Second embodiment (an example using a plurality of frequency channels)

In the first embodiment of the present invention, the receiving apparatus 100 that receives radio signals of one frequency channel in which sub-carriers of different frequencies are multiplexed by a plurality of antennas to estimate the position of a transmitting antenna has been described. In the description related to FIG. 8, for example, the relationship between a path difference and an average phase difference and phase gradient has been described by taking one frequency channel of IEEE 802.1 In whose central frequency $f_{mid}$ is 5 [GHz] as an example.

Here, the phase difference and phase gradient between antennas of each sub-carrier appear more clearly with an increasing bandwidth of frequency channel. The precision with which a path difference is calculated increases with a shorter wavelength of carriers and the phase difference appears more slowly with a longer wavelength of carriers. Thus, in a receiving apparatus 200 according to the second embodiment of the present invention, the precision of position estimation processing is improved by calculating phase differences by changing the frequency channel to a plurality of frequency bands.

Figure 14:
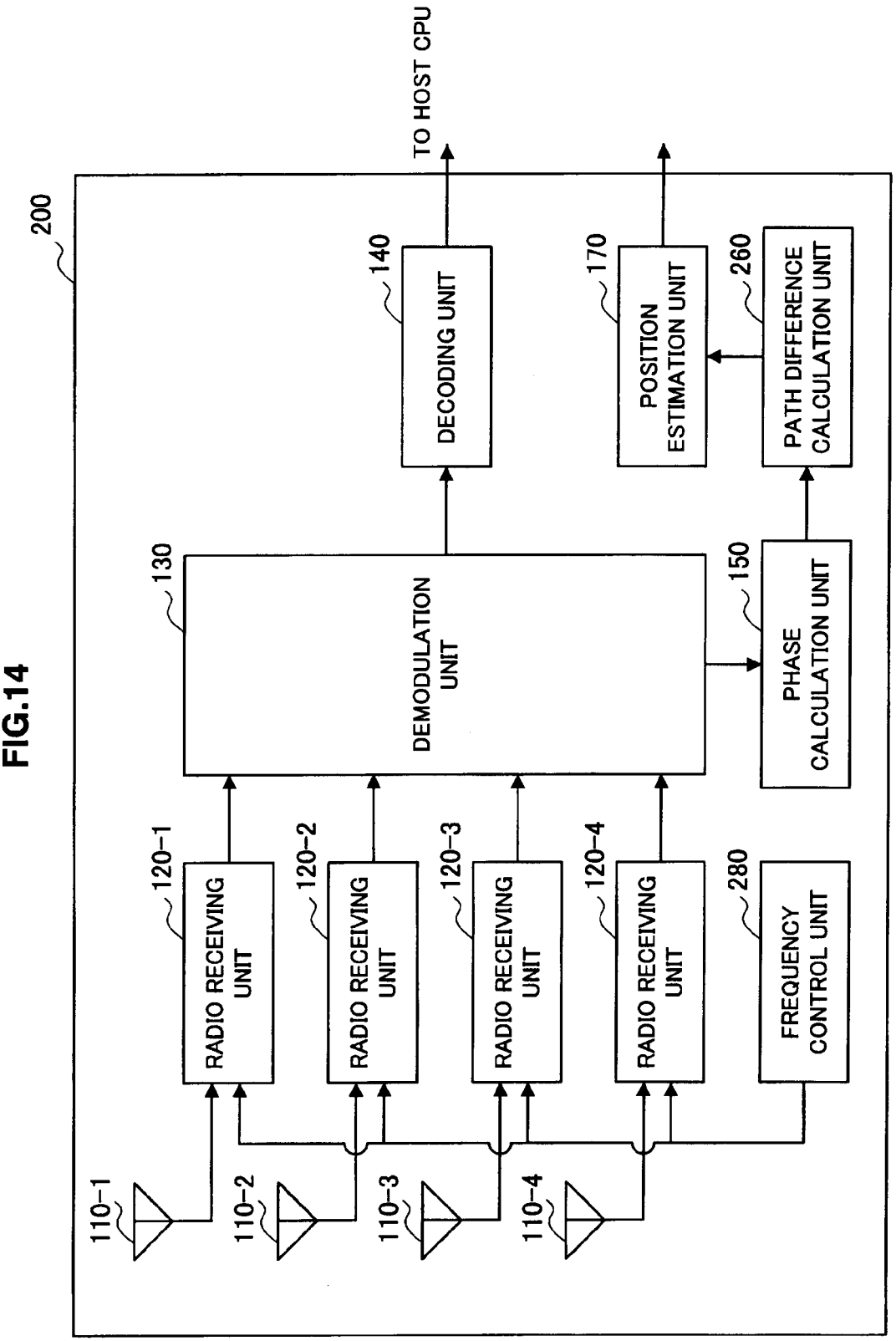
FIG. 14 is a block diagram showing the logical configuration of a receiving apparatus according to a second embodiment.

FIG. 14 is a block diagram showing the logical configuration of the receiving apparatus 200 according to the second embodiment. Referring to FIG. 14, the receiving apparatus 200 has the four receiving antennas 110-n, the four radio receiving units 120-n, the demodulation unit 130, the decoding unit 140, the phase calculation unit 150, a path difference calculation unit 260, the position estimation unit 170, and a frequency control unit 280.

The frequency control unit 280 controls the frequency band of radio signal received by the receiving antennas 110-n by outputting a frequency control signal to the radio receiving units 120-n. Then, the receiving antennas 110-n receive radio signals in a first frequency band and those in a second frequency band in each of which, for example, sub-carriers of different frequencies are multiplexed in accordance with control by the frequency control unit 280. Radio signals in the first and second frequency bands may be, for example, radio signals of the frequency channel whose central frequency is, for example, $f_{mid}$=5.00 [GHz] and those of the frequency channel whose central frequency is $f_{mid}$=5.08 [GHz].

When radio signals in the first frequency band are received by the receiving antennas 110-n, a first phase gradient for radio signals in the first frequency band is calculated for each of the receiving antennas 110-n by the phase calculation unit 150 according to the processing described in connection with the first embodiment. Further, when radio signals in the second frequency band are received by the receiving antennas 110-n, a second phase gradient for radio signals in the second frequency band is similarly calculated by the phase calculation unit 150.

Then, the path difference calculation unit 260 reduces an error of the phase gradient, for example, by calculating an average of the first phase gradient and second phase gradient and then calculates path differences between the receiving antennas 110-n. Or instead, when, for example, the integer m in Formula (1) is decided using Formula (11), the path difference calculation unit 260 may decide the integer m by further using a new phase gradient calculated from a first average phase difference and a second average phase difference, thereby improving precision of path difference calculation.

Figure 15:
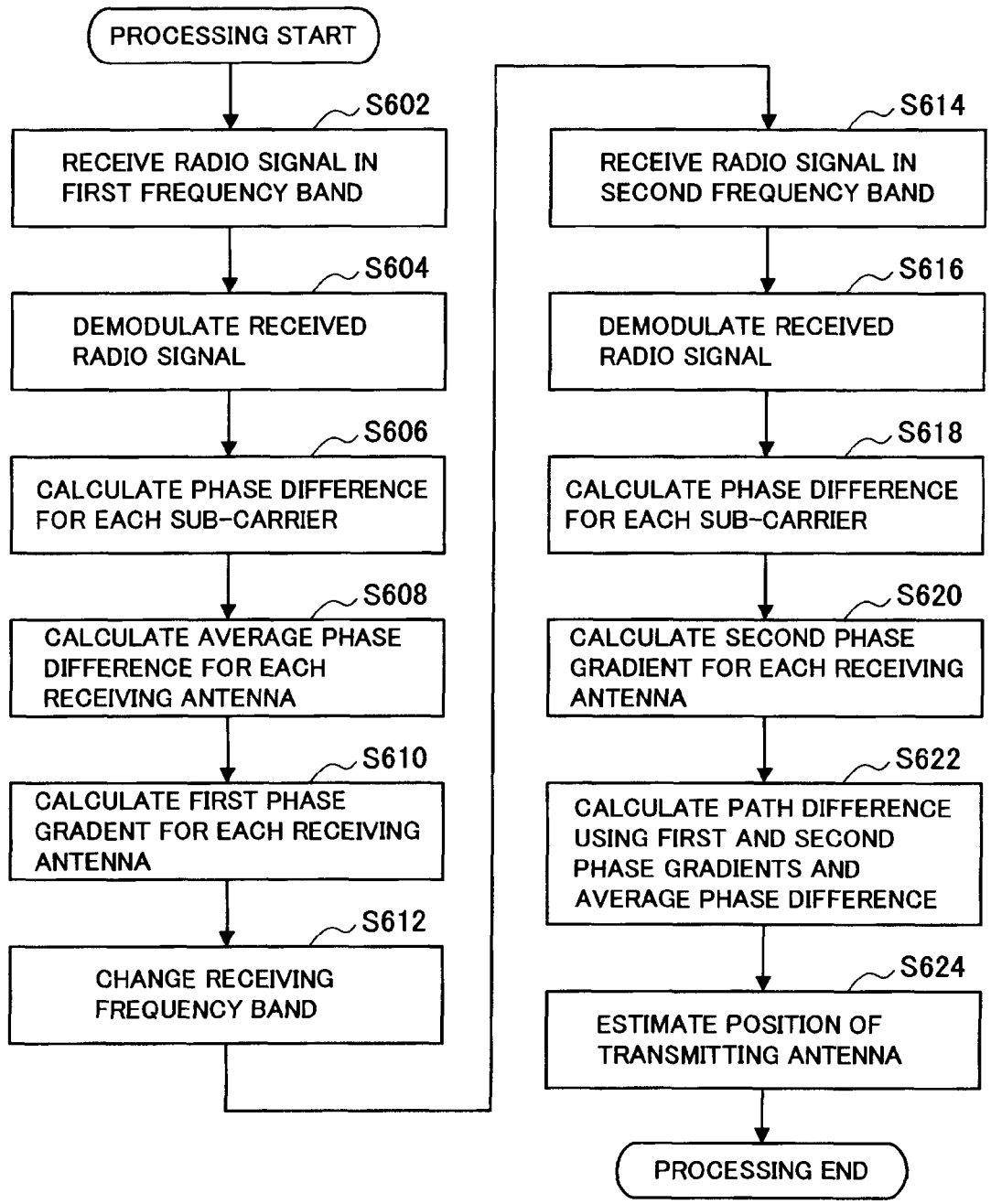
FIG. 15 is a flow chart showing an example of position estimation processing according to the second embodiment.

FIG. 15 is a flow chart showing an example of position estimation processing of a transmitting antenna by the receiving apparatus 200 according to the present embodiment.

Referring to FIG. 15, first, radio signals in which sub-carriers of different frequencies in the first frequency band are multiplexed are received by the plurality of receiving antennas 110-n (S602).

Next, received signals converted into digital signals by the radio receiving units 120-n are demodulated by the demodulation unit 130 before being separated into signals for each sub-carrier (S604).

Then, a phase difference of each signal separated for each sub-carrier from that of a reference signal is calculated by the phase calculation unit 150 (S606).

Subsequently, the phase calculation unit 150 calculates an average phase difference for each of the receiving antennas 110-n using phase differences calculated for each sub-carrier (S608). The phase calculation unit 150 also calculates a first phase gradient for each of the receiving antennas 110-n using phase differences calculated for each sub-carrier (S610).

After calculation of the average phase difference and phase gradient by the phase calculation unit 150 is completed, the frequency control unit 280 outputs a frequency control signal to the radio receiving units 120-n to switch the frequency band of radio signals received by the receiving antennas 110-n from the first frequency band to the second frequency band (S612).

Accordingly, radio signals in which sub-carriers of different frequencies in the second frequency band are multiplexed are received by the plurality of receiving antennas 110-n (S614), demodulated by the demodulation unit 130 (S616), and phase differences from the reference signal are calculated by the phase calculation unit 150 (S618).

Then, the phase calculation unit 150 calculates a second phase gradient for each of the receiving antennas 110-n using phase differences calculated for each sub-carrier (S620).

Then, the path difference calculation unit 260 calculates a difference of paths from the transmitting antenna to any two receiving antennas based on the average phase difference and the first and second phase gradients for each receiving antenna calculated by the phase calculation unit 150 (S622).

Further, the position of the transmitting antenna is estimated by the position estimation unit 170 using path differences calculated for two or more pairs of receiving antennas by the path difference calculation unit 260 (S624).

Up to now, the receiving apparatus 200 according to the second embodiment of the present invention has been described using FIG. 14 and FIG. 15. According to the present embodiment, a phase gradient for each sub-carrier is calculated for radio signals received in two or more frequency bands. Accordingly, an error of path difference calculated based on the phase gradient is reduced so that precision of position estimation is improved.

In the present embodiment, an example in which a path difference from the transmitting antenna is calculated based on the first phase gradient calculated in the first frequency band and the second phase gradient calculated in the second frequency band is described. Instead, however, one phase gradient may be calculated from phase differences for each sub-carrier in one frequency band obtained by considering a frequency band after the bandwidth of the first frequency band and the second frequency band adjacent to each other being extended as one virtual frequency band. If, for example, both the first frequency band and the second frequency band have a bandwidth of 40 MHz, one phase gradient can be calculated for a virtual frequency band of 80 MHz based on phase differences for each sub-carrier calculated for each. Also in this case, an error of path difference calculated based on the phase gradient is reduced so that precision of position estimation is improved.

[4] Third embodiment (an example of a position notification from the transmitting side to the receiving side)

In the first and second embodiments, the position of a transmitting antenna is estimated based on phase differences calculated for sub-carriers contained in radio signals received by a plurality of receiving antennas provided in a receiving apparatus. In the present embodiment, in contrast, the position is estimated based on a similar idea by providing a plurality of transmitting antennas in a transmitting apparatus and receiving radio signals from the plurality of transmitting antennas by one receiving antenna of a receiving apparatus.

Figure 16:
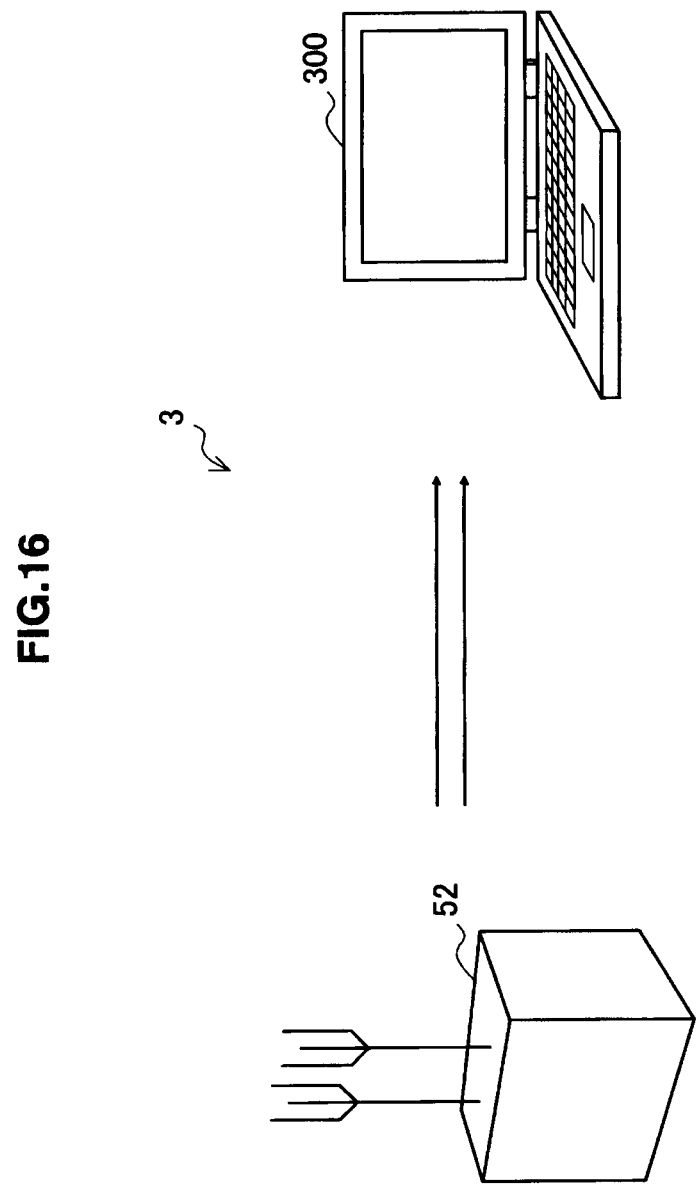
FIG. 16 is a schematic diagram showing a radio communication system according to a third embodiment.

FIG. 16 is a schematic diagram roughly showing a radio communication system 3 according to the third embodiment. Referring to FIG. 16, the radio communication system 3 includes a transmitting apparatus 52 and a receiving apparatus 300.

While FIG. 16 shows a wireless access point as the transmitting apparatus 52, the transmitting apparatus 52 is not limited to a wireless access point. For example, the transmitting apparatus 52 may be an information processing apparatus such as a PC and workstation, a terminal device such as a mobile phone terminal, PDA, and game terminal, a communication dedicated device such as a router, or a radio communication module connected to these devices.

The transmitting apparatus 52 and the receiving apparatus 300 are connected by radio communication according to, for example, the OFDM method.

In the present embodiment, the transmitting apparatus 52 has a plurality of transmitting antennas as described later. Then, radio signals in which sub-carriers of different frequencies are multiplexed are transmitted from the plurality of transmitting antennas to the receiving apparatus 300. The receiving apparatus 300 receives such radio signals transmitted from the plurality of transmitting antennas for position estimation.

Figure 17:
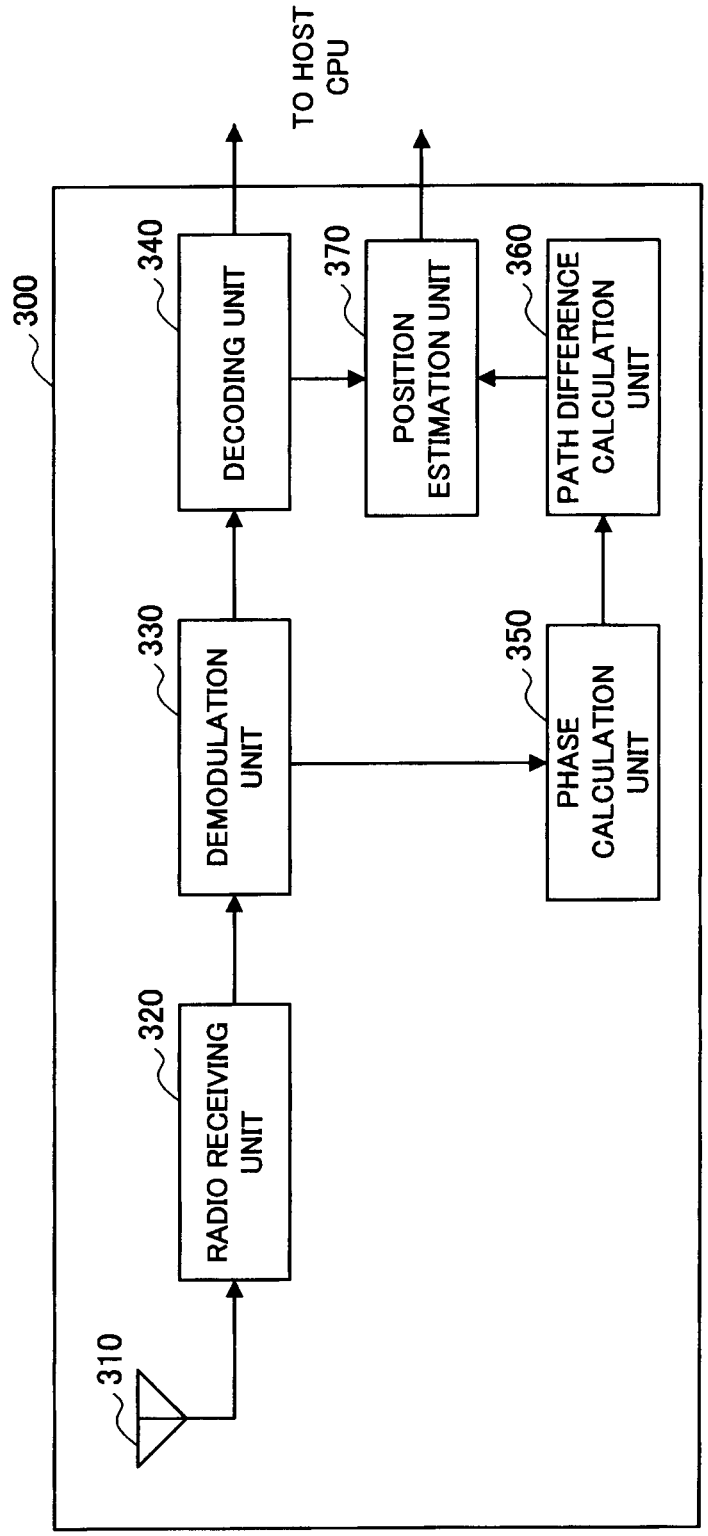
FIG. 17 is a block diagram showing the logical configuration of a receiving apparatus according to the third embodiment.

FIG. 17 is a block diagram showing the logical configuration of the receiving apparatus 300 according to the third embodiment. Referring to FIG. 17, the receiving apparatus 300 includes a receiving antenna 310, a radio receiving unit 320, a demodulation unit 330, a decoding unit 340, a phase calculation unit 350, a path difference calculation unit 360, and a position estimation unit 370.

In the present embodiment, the receiving antenna 310 receives radio signals transmitted from each of the plurality of transmitting antennas.

Figure 18:
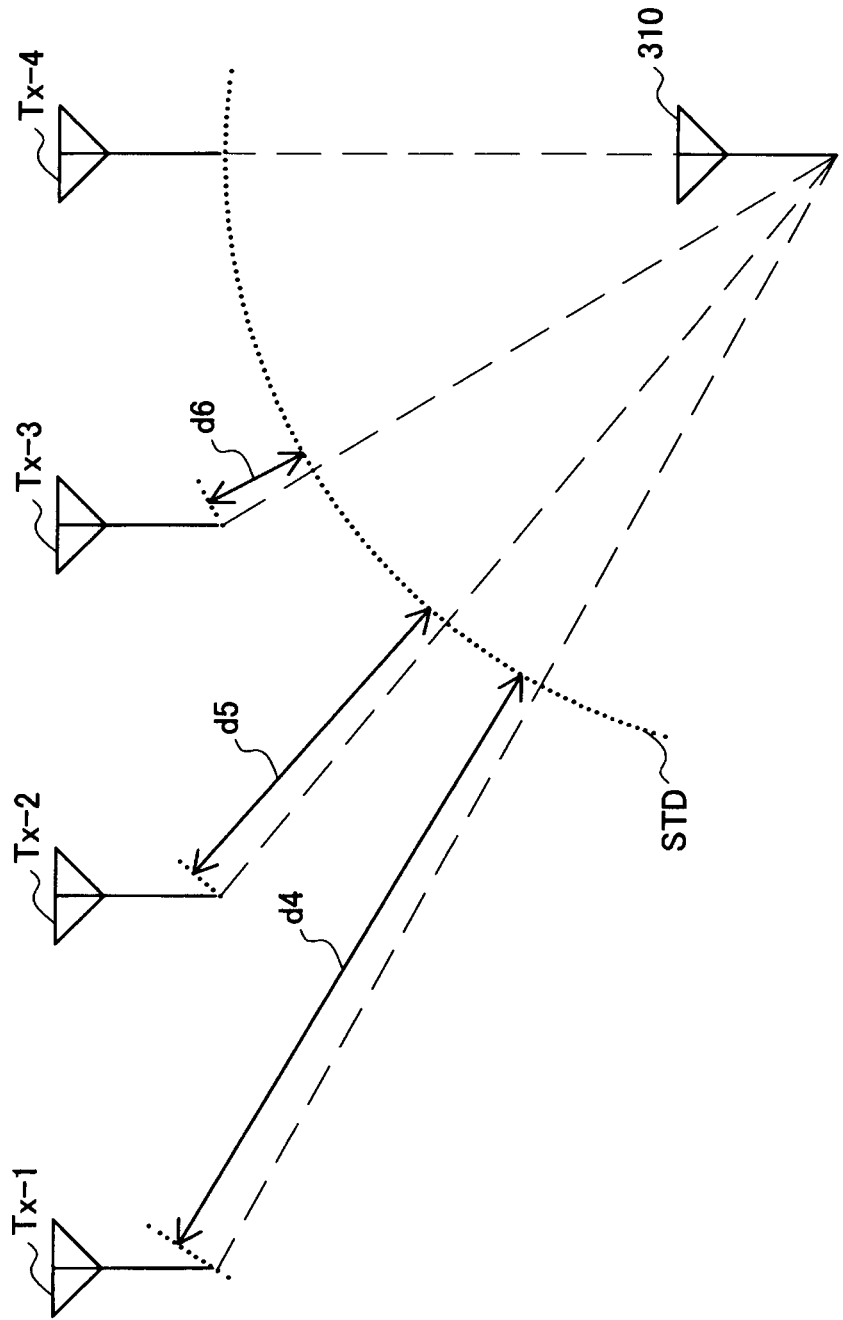
FIG. 18 is an explanatory view illustrating a path difference from each transmitting antenna to the receiving antenna.

FIG. 18 is an explanatory view conceptually showing, as an example, how radio signals transmitted from four transmitting antennas reach the receiving antenna 310. Referring to FIG. 18, paths of radio signals from the transmitting antennas Tx-1, Tx-2, Tx-3, and Tx-4 to the receiving antenna 310 are shown. These transmitting antennas Tx-1, Tx-2, Tx-3, and Tx-4 are provided in the transmitting apparatus 52 as shown in FIG. 16.

In FIG. 18, an arc STD shows a trajectory of positions having a distance to the receiving antenna 310 equal to a path length from the transmitting antenna Tx-4 to the receiving antenna 310.

Assume, for example, the path length from the transmitting antenna Tx-4 to the receiving antenna 310 is used as a reference length. Then, a path difference for the transmitting antenna Tx-1 will be d4, that for the transmitting antenna Tx-2 d5, and that for the transmitting antenna Tx-3 d6. These path differences can be determined from phase differences for each sub-carrier contained in radio signals transmitted from each transmitting antenna Tx-n and received by the receiving antenna 310.

Returning to FIG. 17, the radio receiving unit 320 performs amplification, frequency conversion, analog-digital conversion, filtering, imbalance compensation and the like on a radio signal output from the receiving antenna 310.

The demodulation unit 330 performs packet detection, measurements of synchronization timing and frequency offsets, cutout of OFDM symbols, fast Fourier transforms, channel estimation and the like on a received signal output from the radio receiving unit 320. A stream signal demodulated by the demodulation unit 330 is output to the decoding unit 340 and the phase calculation unit 350.

The decoding unit 340 performs digital demodulation and decoding of the demodulated stream signal input from the demodulation unit 330. A decoded data signal is output, for example, to a CPU from the decoding unit 340.

The phase calculation unit 350 calculates a phase difference of each radio signal transmitted from each of the transmitting antennas Tx-n from that of any reference signal for each sub-carrier contained in the stream signal demodulated by the demodulation unit 330. A phase difference may also be calculated by multiplying the complex conjugate value of the reference signal by the signal value of each sub-carrier. Further, the phase calculation unit 350 calculates an average phase difference and a phase gradient for each of the transmitting antennas Tx-n using calculated phase differences.

Then, the path difference calculation unit 360 calculates a difference of paths from any two transmitting antennas Tx-n to the receiving antenna 310 based on the average phase difference and phase gradient for each of the transmitting antennas Tx-n calculated by the phase calculation unit 350. A path difference is calculated, for example, by following Formula (1) to Formula (11) described above.

Here, even if a path difference from the receiving antenna 310 to the transmitting antennas Tx-n is obtained, it is not possible for the receiving apparatus 300 to specify the positions of the transmitting and receiving apparatuses unless a mutual spatial relationship of the transmitting antennas Tx-n is known.

Thus, in the present embodiment, position information of each of the transmitting antennas Tx-n is inserted, for example, into the data part (DATA) of a packet shown in FIG. 6 by the transmitting apparatus 52. Then, in the receiving apparatus 300, the decoding unit 340 outputs a decoded data signal to the position estimation unit 370 and the position estimation unit 370 acquires the position information of each of the transmitting antennas Tx-n.

Assume, for example, that in the transmitting apparatus 52, absolute position information of each of the transmitting antennas Tx-n is input into the data part of a packet. In this case, the position estimation unit 370 of the receiving apparatus 300 acquires the absolute position information from among data signals decoded by the decoding unit 340. Then, the position estimation unit 370 can estimate the absolute position of the receiving antenna 310 by the technique described using FIG. 10 to FIG. 12 based on the acquired absolute position information and path differences of two or more pairs of transmitting antennas Tx-n of the transmitting antennas Tx-n.

The position estimation method as described above is particularly effective, as shown in FIG. 16 as an example, when the transmitting apparatus 52 is a fixed wireless access point (or a radio base station) and the receiving apparatus 300 is a mobile terminal device. In such a case, for example, the transmitting apparatus 52 may record absolute position information of the local apparatus in a storage device thereof to contain the absolute position information in a packet, which is then transmitted to the receiving apparatus 300.

Up to now, the transmitting apparatus 52 and the receiving apparatus 300 according to the third embodiment of the present invention have been described using FIG. 16 to FIG. 18. According to the present embodiment, radio signals in which sub-carriers of different frequencies are multiplexed are transmitted from the plurality of transmitting antennas Tx-n provided in the transmitting apparatus 52 to the receiving apparatus 300. The phase calculation unit 350 of the receiving apparatus 300 calculates a phase difference of each of the radio signals received from the plurality of transmitting antennas from that of the reference signal for each sub-carrier. Then, the path difference calculation unit 360 calculates a difference of paths from any two transmitting antennas Tx-n to the receiving antenna 310 based on the phase difference calculated by the phase calculation unit 350.

At this point, absolute position information of the transmitting antennas Tx-n is transmitted to the receiving apparatus 300 using, for example, the data part of a radio signal and acquired by the position estimation unit 370 of the receiving apparatus 300. Accordingly, the position estimation unit 370 can estimate the absolute position of the receiving antenna 310 of the receiving apparatus 300 based on the acquired absolute position information and the path difference.

Here, it does not matter whether a sequence of processing according to the first to third embodiments described herein is realized by hardware or software. If a sequence of processing or part thereof is to be realized by software, a program constituting the software is executed by using a computer incorporated into dedicated hardware or a general-purpose computer shown, for example, in FIG. 19.

Figure 19:
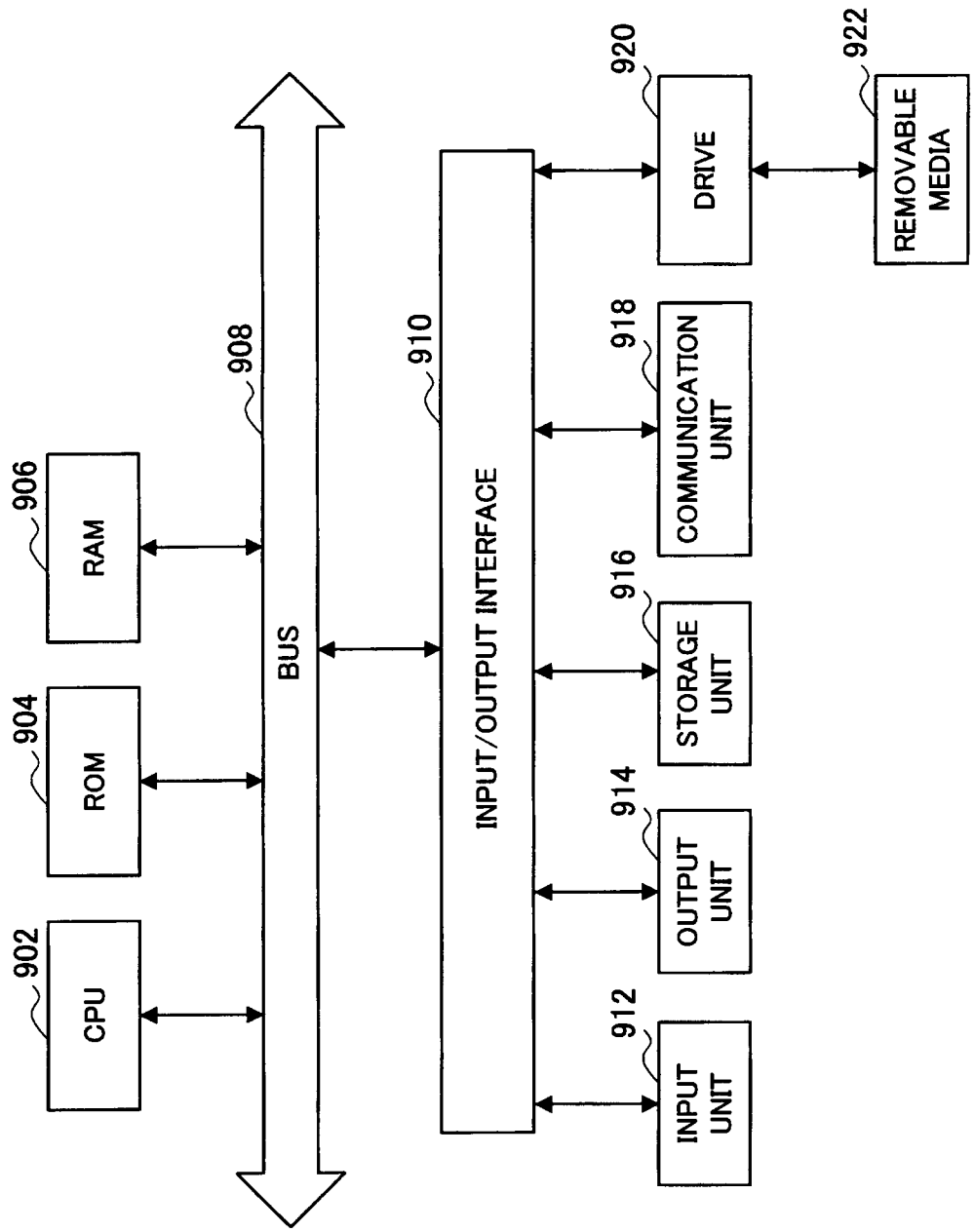
FIG. 19 is a block diagram showing a configuration example of a general-purpose computer.

In FIG. 19, a CPU (Central Processing Unit) 902 controls overall operations of a general-purpose computer. A ROM (Read Only Memory) 904 has programs describing part or all of a sequence of processing and data stored therein. A RAM (Random Access Memory) 906 has programs and data used by the CPU 902 for arithmetic processing temporarily stored therein.

The CPU 902, the ROM 904, and the RAM 906 are mutually connected via a bus 908. An input/output interface 910 is further connected to the bus 908.

The input/output interface 910 is an interface to connect the CPU 902, the ROM 904, and the RAM 906 and an input unit 912, an output unit 914, a storage unit 916, a communication unit 918, and a drive 920.

The input unit 912 receives instructions or input information from a user via an input device such as a button, switch, lever, mouse, and keyboard. The output unit 914 outputs information to the user via, for example, a display device such as a CRT (Cathode Ray Tube), liquid crystal display, and OLED (Organic Light Emitting Diode), or a sound output apparatus such as a speaker.

The storage unit 916 is constituted, for example, by a hard disk drive, flash memory or the like and stores programs, program data, image data and the like. The communication unit 918 performs communication processing via a network such as a LAN (Local Area Network) and the Internet. The drive 920 is provided in the general-purpose computer when necessary and, for example, a removable medium 922 is inserted onto the drive 920.

If a sequence of processing according to the first to third embodiments is to be performed by software, for example, a program stored in the ROM 904, the storage unit 916, or the removable medium 922 shown in FIG. 19 is read into the RAM 906 during execution and executed by the CPU 902.

In the foregoing, preferred embodiments of the present invention have been described with reference to attached drawings, but it is needless to say that the present invention is not limited to such examples. It is obvious for a person skilled in the art that various alterations or modifications can be made within the category described in the scope of claims and it is understood that such alterations or modifications naturally belong to the technical scope of the present invention.

For example, position estimation processing according to the first embodiment described using FIG. 13 need not necessarily be performed along the sequence described in the flow chart. Each processing step may contain processing performed in parallel or, individually and independently.

The present invention contains subject matter related to Japanese Patent Application JP 2008-182961 filed in the Japan Patent Office on Jul. 14, 2008, the entire contents of which being incorporated herein by reference.

What is claimed is:

1. A receiving apparatus, comprising:
a plurality of receiving antennas, each of which receives a radio signal in which sub-carriers of different frequencies are multiplexed;
a phase calculation unit that calculates a phase difference of each radio signal received by the plurality of receiving antennas from that of a reference signal for each of the sub-carriers contained in the radio signal; and
a path difference calculation unit that calculates a path difference, which is a difference of distances from a transmitting antenna from which the radio signals are transmitted to any two receiving antennas of the plurality of receiving antennas, based on the phase difference calculated by the phase calculation unit;
wherein the phase calculation unit calculates an average phase and a phase gradient for each of the receiving antennas using the phase difference for each of the sub-carriers; and
the path difference calculation unit calculates the path difference based on the average phase difference and the gradient calculated by the phase calculation unit.

2. The receiving apparatus according to claim 1, wherein the path difference calculation unit calculates the path differences for two or more pairs of receiving antennas of the plurality of receiving antennas;
the receiving apparatus, further comprising:
a position estimation unit that estimates a position of the transmitting antenna using the path differences calculated for two or more pairs of receiving antennas by the path difference calculation unit.

3. The receiving apparatus according to claim 1, wherein the reference signal is a radio signal received by one receiving antenna of the plurality of receiving antennas.

4. The receiving apparatus according to claim 1, wherein the phase calculation unit calculates a complex conjugate value of the reference signal to calculate the phase difference by multiplying the calculated complex conjugate value of the reference signal by a signal value for each sub-carrier contained in each radio signal.

5. The receiving apparatus according to claim 1, wherein the path difference calculation unit calculates the path difference by a subspace approach based on the phase difference calculated by the phase calculation unit.

6. The receiving apparatus according to claim 1, wherein the phase calculation unit calculates the phase difference of each radio signal received by the plurality of receiving antennas from that of the reference signal for each of the sub-carriers contained in the radio signal a plurality of times and
the path difference calculation unit reduces an error contained in the path difference by calculating the path difference using a plurality of the phase differences calculated the plurality of times by the phase calculation unit.

7. The receiving apparatus according to claim 1, further comprising:
a control unit that controls a frequency band of radio signals received by the plurality of receiving antennas, wherein
the plurality of receiving antennas receives radio signals in a first frequency band and those in a second frequency band, in each of which sub-carriers of different frequencies are multiplexed, in accordance with control by the control unit and
the path difference calculation unit reduces an error of the phase gradient used for calculation of the path difference by using a first phase gradient for each of the receiving antennas calculated for radio signals in the first frequency band and a second phase gradient for each of the receiving antennas calculated for radio signals in the second frequency band.

8. The receiving apparatus according to claim 1, wherein the radio signal is a radio signal modulated by an Orthogonal Frequency Division.

9. A position estimation method, comprising the steps of:
receiving a radio signal in which sub-carriers of different frequencies are multiplexed by each of a plurality of receiving antennas;
calculating a phase difference of each radio signal received by the plurality of receiving antennas from that of a reference signal for each of the sub-carriers contained in the radio signal; and
calculating a path difference, which is a difference of distances from a transmitting antenna from which the radio signals are transmitted to any two receiving antennas of the plurality of receiving antennas, based on the calculated phase difference;

wherein an average phase difference and a phase gradient is calculated for each of the receiving antennas using the phase difference for each of the sub-carriers; and the path difference is calculated based on the average phase difference and the phase gradient calculated by the phase calculation unit.

10. A program to cause a computer that controls a receiving apparatus having a plurality of receiving antennas, each of which receives a radio signal in which sub-carriers of different frequencies are multiplexed, to function, comprising:

a phase calculation unit that calculates a phase difference of each radio signal received by the plurality of receiving antennas from that of a reference signal for each of the sub-carriers contained in the radio signal; and a path difference calculation unit that calculates a path difference, which is a difference of distances from a transmitting antenna from which the radio signals are transmitted to any two receiving antennas of the plurality of receiving antennas, based on the phase difference calculated by the phase calculation unit;

wherein the phase calculation unit calculates an average phase difference and a phase gradient for each of the receiving antennas using the phase difference for each of the sub-carriers and the path difference calculation unit calculates the path difference based on the average phase difference and the phase gradient calculated by the phase calculation unit.

* * * * *